US011292238B2

(12) United States Patent
Toft et al.

(10) Patent No.: US 11,292,238 B2
(45) Date of Patent: *Apr. 5, 2022

(54) METHOD OF MANUFACTURING A LAMINATED PACKAGING MATERIAL, THE PACKAGING MATERIAL OBTAINED BY THE METHOD AND PACKAGING CONTAINERS MANUFACTURED THEREFROM

(71) Applicant: TETRA LAVAL HOLDINGS & FINANCE S.A., Pully (CH)

(72) Inventors: Nils Toft, Lund (SE); Ulf Nyman, Eslöv (SE); Peter Frisk, Malmö (SE); Alain Collaud, St-Aubin (CH); Peter Öhman, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,813

(22) Filed: Aug. 24, 2020

(65) Prior Publication Data
US 2020/0384752 A1 Dec. 10, 2020

Related U.S. Application Data

(63) Continuation of application No. 15/779,205, filed as application No. PCT/EP2016/078754 on Nov. 25, 2016, now Pat. No. 10,759,155.

(30) Foreign Application Priority Data

Nov. 27, 2015 (EP) .................................... 15196871

(51) Int. Cl.
*B32B 37/12* (2006.01)
*B32B 27/10* (2006.01)
(Continued)

(52) U.S. Cl.
CPC ................ *B32B 37/12* (2013.01); *B32B 5/18* (2013.01); *B32B 5/20* (2013.01); *B32B 5/26* (2013.01);
(Continued)

(58) Field of Classification Search
CPC ..... B32B 37/203; B32B 37/12; B32B 37/153; B32B 37/144; B32B 2307/72;
(Continued)

(56) References Cited

U.S. PATENT DOCUMENTS 6,221,212 B1    4/2001   Sjoestroem
6,537,680 B1 *  3/2003   Norlander ............... B32B 29/00
                                                    428/532

(Continued)

FOREIGN PATENT DOCUMENTS

CN    102470626 A    5/2012
EP    1 936 032 A1   6/2008
(Continued)

OTHER PUBLICATIONS

International Search Report (PCT/ISA/210) dated Jan. 11, 2017, by the European Patent Office as the International Searching Authority for International Application No. PCT/EP2016/078754.
(Continued)

*Primary Examiner* — John L Goff, II
(74) *Attorney, Agent, or Firm* — Buchanan Ingersoll & Rooney PC

(57) ABSTRACT

The present invention relates to a method for manufacturing of a laminated cellulose-based liquid or semi-liquid food packaging material, wherein the laminated packaging material has a bulk material layer comprising a low-density cellulose spacer layer, an outside module comprising a substrate layer having a print surface and an inside material module comprising a barrier layer or barrier coating. The
(Continued)

invention further relates the laminated packaging materials obtained by the method and to a packaging container for liquid food packaging, comprising the laminated packaging material or being made from the laminated packaging material obtained by the method.

22 Claims, 10 Drawing Sheets

(51) Int. Cl.

| | | |
|---|---|---|
| B32B 5/20 | (2006.01) | |
| B32B 27/32 | (2006.01) | |
| B32B 29/00 | (2006.01) | |
| B32B 23/00 | (2006.01) | |
| B32B 23/06 | (2006.01) | |
| B32B 27/34 | (2006.01) | |
| B32B 5/26 | (2006.01) | |
| B32B 7/12 | (2006.01) | |
| B32B 27/36 | (2006.01) | |
| B32B 23/08 | (2006.01) | |
| B32B 29/08 | (2006.01) | |
| B32B 15/09 | (2006.01) | |
| B32B 15/082 | (2006.01) | |
| B32B 23/04 | (2006.01) | |
| B32B 7/04 | (2019.01) | |
| B32B 27/08 | (2006.01) | |
| B32B 29/06 | (2006.01) | |
| B32B 15/085 | (2006.01) | |
| B32B 15/08 | (2006.01) | |
| B32B 7/02 | (2019.01) | |
| B32B 15/088 | (2006.01) | |
| B32B 27/30 | (2006.01) | |
| B32B 5/18 | (2006.01) | |
| B65B 9/20 | (2012.01) | |
| B32B 29/02 | (2006.01) | |
| B32B 37/20 | (2006.01) | |
| B65D 5/74 | (2006.01) | |
| B32B 37/14 | (2006.01) | |

(52) U.S. Cl.
CPC .................. *B32B 7/02* (2013.01); *B32B 7/04* (2013.01); *B32B 7/12* (2013.01); *B32B 15/08* (2013.01); *B32B 15/082* (2013.01); *B32B 15/085* (2013.01); *B32B 15/088* (2013.01); *B32B 15/09* (2013.01); *B32B 23/00* (2013.01); *B32B 23/046* (2013.01); *B32B 23/048* (2013.01); *B32B 23/06* (2013.01); *B32B 23/08* (2013.01); *B32B 27/08* (2013.01); *B32B 27/10* (2013.01); *B32B 27/304* (2013.01); *B32B 27/306* (2013.01); *B32B 27/32* (2013.01); *B32B 27/325* (2013.01); *B32B 27/327* (2013.01); *B32B 27/34* (2013.01); *B32B 27/36* (2013.01); *B32B 29/00* (2013.01); *B32B 29/002* (2013.01); *B32B 29/005* (2013.01); *B32B 29/02* (2013.01); *B32B 29/06* (2013.01); *B32B 29/08* (2013.01); *B32B 37/203* (2013.01); *B65B 9/20* (2013.01); *B32B 37/144* (2013.01); *B32B 2037/1276* (2013.01); *B32B 2250/00* (2013.01); *B32B 2250/26* (2013.01); *B32B 2266/00* (2013.01); *B32B 2266/02* (2013.01); *B32B 2307/31* (2013.01); *B32B 2307/402* (2013.01); *B32B 2307/4023* (2013.01); *B32B 2307/4026* (2013.01); *B32B 2307/41* (2013.01); *B32B 2307/50* (2013.01); *B32B 2307/514* (2013.01); *B32B 2307/516* (2013.01); *B32B 2307/518* (2013.01); *B32B 2307/538* (2013.01); *B32B 2307/718* (2013.01); *B32B 2307/72* (2013.01); *B32B 2307/724* (2013.01); *B32B 2307/726* (2013.01); *B32B 2307/7242* (2013.01); *B32B 2307/7244* (2013.01); *B32B 2307/7265* (2013.01); *B32B 2307/75* (2013.01); *B32B 2439/00* (2013.01); *B32B 2439/40* (2013.01); *B32B 2439/62* (2013.01); *B32B 2439/70* (2013.01); *B65D 5/746* (2013.01)

(58) Field of Classification Search
CPC .... B32B 2307/7244; B32B 2307/7265; B32B 2307/75; B32B 2307/1276; B32B 2307/31; B32B 2307/50; B32B 2307/718; B32B 2439/70; B32B 7/12; B32B 23/00; B32B 23/06; B32B 23/08; B32B 23/10; B32B 27/10; B32B 27/08; B32B 29/005; B32B 2037/1276; B32B 2250/26; B32B 29/00; B32B 29/002; B32B 29/007; B32B 29/02; B32B 29/08
See application file for complete search history.

(56) References Cited

U.S. PATENT DOCUMENTS

| | | | |
|---|---|---|---|
| 10,328,666 B2 | 6/2019 | Nyman et al. | |
| 10,759,155 B2* | 9/2020 | Toft | .................. B32B 27/10 |
| 10,850,901 B2* | 12/2020 | Nordstrom | ............ D21H 27/40 |
| 2002/0127358 A1 | 9/2002 | Berlin et al. | |
| 2008/0070047 A1 | 3/2008 | Rehkugler et al. | |
| 2010/0024998 A1 | 2/2010 | Wildlock et al. | |
| 2010/0038266 A1 | 2/2010 | Haellstroem et al. | |
| 2012/0103856 A1 | 5/2012 | Toft et al. | |
| 2017/0120556 A1 | 5/2017 | Nyman et al. | |
| 2018/0304607 A1 | 10/2018 | Öhman et al. | |
| 2018/0305098 A1 | 10/2018 | Nyman et al. | |
| 2018/0311940 A1 | 11/2018 | Toft et al. | |
| 2018/0319559 A1 | 11/2018 | Toft et al. | |
| 2018/0354690 A1 | 12/2018 | Collaud et al. | |

FOREIGN PATENT DOCUMENTS

| | | |
|---|---|---|
| EP | 2949597 A1 | 12/2015 |
| EP | 3 026 173 A1 | 6/2016 |
| GB | 2303630 A | 2/1997 |
| WO | 2011003567 A2 | 1/2011 |
| WO | 2015181281 A1 | 12/2015 |
| WO | 2016008744 A1 | 1/2016 |

OTHER PUBLICATIONS

Written Opinion (PCT/ISA/237) dated Jan. 11, 2017, by the European Patent Office as the International Searching Authority for International Application No. PCT/EP2016/078754.
European Search Report dated Dec. 18, 2020, by the European Patent Office in corresponding European Patent Application No. 20 20 6253. (4 pages).

* cited by examiner

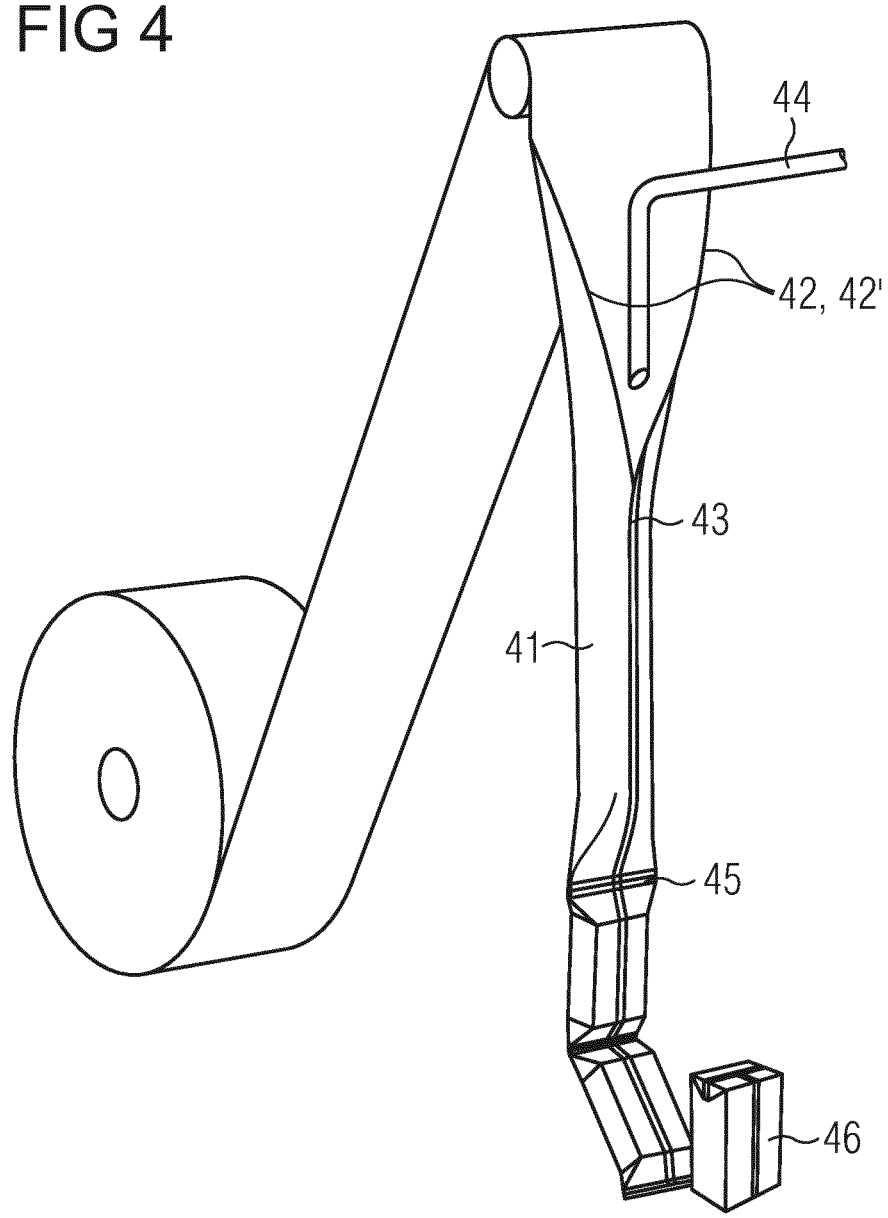

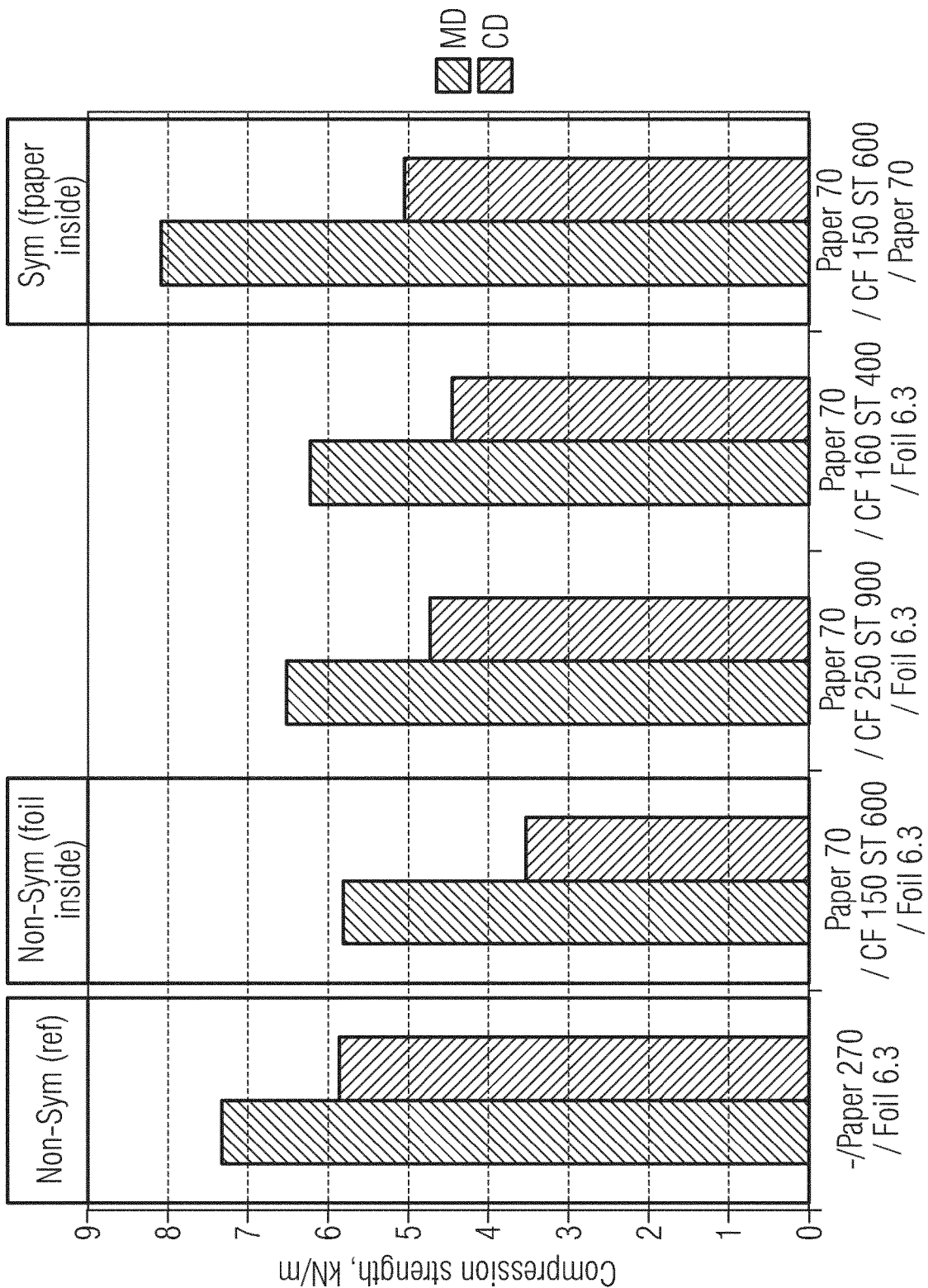

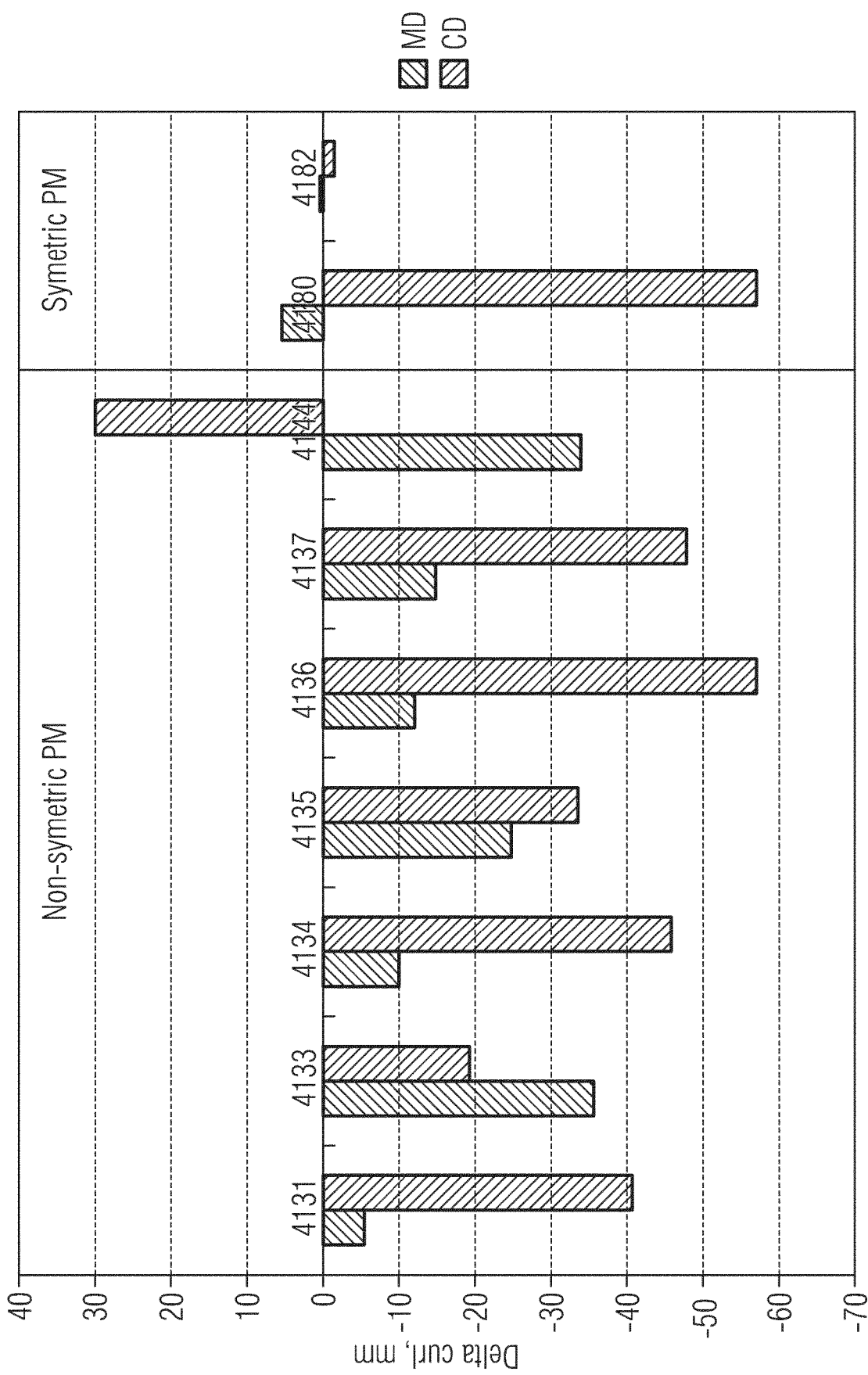

METHOD OF MANUFACTURING A LAMINATED PACKAGING MATERIAL, THE PACKAGING MATERIAL OBTAINED BY THE METHOD AND PACKAGING CONTAINERS MANUFACTURED THEREFROM

CROSS-REFERENCES TO RELATED APPLICATIONS

This application is a continuation application of U.S. patent application Ser. No. 15/779,205 filed May 25, 2018, now U.S. Pat. No. 10,759,155, which is a U.S. national stage application based on International Patent Application No. PCT/EP2016/078754 filed Nov. 25, 2016, and claims priority to European Patent Application No. 15196871.6 filed on Nov. 27, 2015, the entire content of all three of which is incorporated herein by reference.

FIELD OF THE INVENTION

The present invention relates to a, laminated packaging material and to a method for manufacturing the laminated packaging material.

Furthermore, the invention relates to packaging containers comprising the laminated packaging material or being made of the laminated packaging material. In particular, the invention relates to packaging containers intended for liquid food packaging, comprising the laminated packaging material.

BACKGROUND

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc., sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Any other material to compete with such foil-based materials must be cost-efficient regarding raw materials, have comparable food preserving properties, be sufficiently mechanically stable and have a comparably low complexity in the converting into a finished packaging laminate.

Decreasing the costs of today's packaging material further, can be made by down-gauging the thickness of the polymer layers or by seeking to replace the aluminium foil barrier by one or more different barrier layers, which has proven to be quite a challenge. A different way of saving costs, which has hitherto not been seen as practical in the field of liquid carton packaging, would be by down-gauging the cellulose-based bulk layer by type and/or amount of cellulose fibre material. It normally leads to the important properties of mechanical strength and packaging integrity, as well as material barrier properties, being jeopardized and has previously been considered as a less favourable way forward. The paperboard is a major part of liquid carton packaging material, however also representing a major part of the total packaging material costs.

A further requirement on future laminated packaging materials for liquid packaging containers is that the appearance of such packaging containers should be possible to differentiate to a higher degree, i.e. by providing new, interesting and appealing decorative or tactile features to attract consumers and retailers. Such features are for example, background effects to printed décor patterns such as gold metallisation or other different shiny colours, embossing and engraving features such as hologram decorations, tactile or relief surface effects, matte/glossy surfaces, etc. The increasing desire for such differentiation options is a challenge, since additions of features and materials normally, automatically entail higher costs of raw materials and/or manufacturing processes.

SUMMARY

It is now, considering the above, an object of the present invention to realise a new way of reducing costs of laminated cellulose-based liquid- or semi-liquid food packaging materials.

It is also a general object of the invention to provide a method of manufacturing at lower cost laminated cellulose-based packaging material having sufficient mechanical stability as well as good barrier and integrity properties, which fulfil the needs in liquid carton laminated packaging materials.

It is another object of the invention to provide a low-cost such laminated packaging material having an increased content of materials based on biological and renewable materials, i.e. from sources not exploiting fossil raw materials.

A yet further object, is to provide a method of manufacturing a laminated cellulose-based packaging material based on a down-gauged bulk or core layer, which has inadequate mechanical performance for liquid packaging material as it is currently designed and produced, in comparison to conventional liquid packaging paperboard, such as reduced bending stiffness or lower bending stiffness.

It is a particular object of the invention to provide a cost-efficient, non-foil, cellulose-based and heat-sealable packaging laminate having optimal compression strength and bending stiffness, for the purpose of manufacturing aseptic packaging containers for long-term storage of liquid foods at maintained nutritional quality under ambient conditions.

A still further, particular object is to provide such a packaging laminate without moisture curling problems, i.e. with edges of the web of the laminated packaging material staying flat and at level with the rest of the packaging material web or blank.

Another particular object is to provide such packaging laminates with decorative and tactile differentation options that are additional to conventional printed décor options, such that a choice of attractive décor- and surface-effects of the laminated packaging material are enabled, while still avoiding increased costs.

It is thus an object, to enable cost-efficient differentiation of the outside layers of a lamianted packaging material, i.e. the layers which will attract and appeal to consumers, on the outside of a packaging container. Such outside layers may according to the method of the invention easily be swapped, such that different decorative and/or tactile features may be laminated into the material, according to different desires among dairy and filler customers, consumers and retailers. Such customisation makes it possible to produce separate, shorter series of differently decorated and tailor-made packaging materials, without creating stoppages, waste and logistics problems in the main stream of the material manufacturing line.

It is also an object, to correspondingly enable differentiation opportunities regarding the inside barrier materials in order to match different food product needs, by increasing the degree of freedom of how to swap or add material layers between inside and outside material modules, while still reaching the required mechanical properties of the total packaging laminate.

Some or all of these objects are thus attainable according to the present invention by the method of manufacturing the laminated packaging material, the packaging material obtained by the method as well as a packaging container made therfrom, as defined in the appended claims.

BRIEF DESCRIPTION OF THE DRAWINGS

In the following, preferred embodiments of the invention will be described with reference to the drawings, of which:

FIG. 4 shows the principle of how packaging containers may be manufactured from the packaging laminate in a continuous, roll-fed, form, fill and seal process, FIG. 5 is a diagram which shows how the curling problem varies with different examples of symmetric and non-symmetric laminated layer structures, FIG. 6 is a diagram showing how the compression strength varies with different laminated material layer structures and is at its optimal value when there are symmetrical paper facing layers arranged on both sides of the spacer layer.

DETAILED DESCRIPTION

Figure 1A:
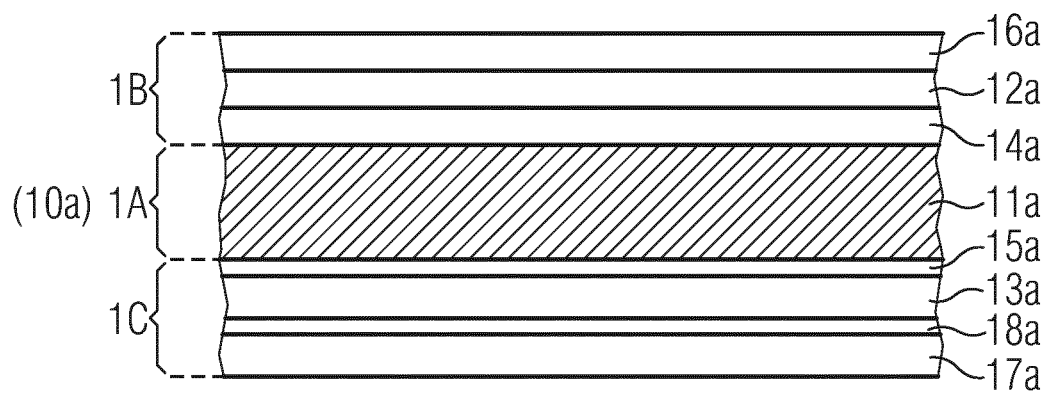
FIG. 1a is showing a schematic, cross-sectional view of a laminated packaging material of a three-modular laminate type, according to an embodiment of the invention.

With the term "long-term storage" in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package durability, i.e. the resistance to leakage or breakage of a packaging container. A main contribution to this property is that within a packaging laminate there is provided good internal adhesion between adjacent layers of the laminated packaging material. Another contribution comes from the material resistance to defects, such as pinholes, ruptures and the like within the material layers, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers.

The term "liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air.

With the term "bulk layer" is normally meant the thickest layer or the layer containing the most material in a multilayer laminate, i.e. the layer which is contributing most to the mechanical properties and the dimensional stability of the laminate and of packaging containers folded from the laminate. In the context of the present invention, it may also mean the layer providing a greater thickness distance in a sandwich structure, which further interacts with stabilising facing layers, which have a higher Young's modulus, on each side of the bulk layer, in order to achieve sufficient such mechanical properties and dimensional stability.

A "spacer layer" is a layer that creates a distance or space between significantly thinner material layers, which have a higher Young's modulus and density, such as a high-density, high-tensile stiffness paper layer, foil or film, arranged on each side of the spacer layer, i.e. stiffness- and stability-providing layers, so-called facing layers. The spacer layer has a lower or reduced inherent bending stiffness and thus does not itself contribute directly to the bending stiffness of a laminated packaging material. Indirectly, it may contribute very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. When the spacer layer has very low density and is not contributing itself by any bending stiffness property, one facing layer on each side of the spacer layer is needed. When the distance between the paper facing layers is increased, also the flexural strength and bending stiffness of the laminated sandwich structure will be increased. A "bulk layer" may comprise a "spacer layer" and a further combined or integrated layer within the bulk, but may also be the same as a spacer layer.

According to a first aspect of the invention, there is provided a method for manufacturing a laminated cellulose-based liquid or semi-liquid food packaging material, for heat sealing into packages having sufficient mechanical strength and barrier properties, as well as an attractive outside appearance, comprising the steps of a) providing a web of a center module bulk material comprising a low-density cellulose spacer layer, which has no or low inherent bending stiffness with a density below 850 kg/m$^3$ and a gram mage from 60 to 250 g/m$^2$, b) providing a web of an outside material module, comprising at least a print substrate layer with or without a decor printed or applied thereon, the outside material module being intended for that side of the center module bulk material, which is to be directed to the outside of a packaging container made from the laminated packaging material, c) laminating the outside of the web of the center module bulk material and the web of the outside material module to each other, d) adding the decor to the outside material module, e) providing a web of an inside material module, comprising at least a barrier layer, the inside material module being intended for that side of the bulk material, which is to be directed to the inside of a packaging container made from the laminated packaging material, f) laminating the web of the inside material module and the inside of the web of the center module bulk material to each other, g) applying an outermost, transparent and liquid-tight protective layer on the outside of the outside material module, h) applying an outermost thermoplastic, liquid-tight and heat sealable layer on the inside of the inside material module, i) thus obtaining a web of the laminated cellulose-based liquid- or viscous-food packaging material, for further winding onto a reel, wherein the spacer layer constitutes the center of a sandwich structure within the laminated packaging material, the sandwich structure having at least one paper facing layer arranged on at least one side of the spacer layer and interacting with a further facing layer arranged on the other side of the spacer layer, the paper facing layer and the further facing layer having significantly lower thickness but a higher Young's modulus than the spacer layer.

The method steps may take place in any order, although the order as listed above is considered favourable from a lamination set-up point-of-view.

The low-density cellulose spacer layer may have a density lower than 750 kg/m$^3$, such as below 700 kg/m$^3$.

Furthermore, the spacer layer may have a bending stiffness which is at least 30% lower than the bending stiffness of a liquid carton paperboard, of the Triplex or Duplex type, which has a corresponding grammage, from 60 to 250 g/m$^2$, when excluding the printable coating (clay-coat) grammage.

Thus, suitable spacer layers have a bending stiffness being from 30 to 100% lower than the bending stiffness of a liquid carton paperboard, of the Triplex or Duplex type, at a corresponding grammage when excluding the printable coating (clay-coat) grammage.

According to a different embodiment, which is more favourable for maintaining the bending stiffness of the laminated packaging material, to be as high as possible up until the moment of re-shaping the flat packaging material into fold formed packages, the outside and inside material modules should be pre-laminated in separate steps, and then be laminated to the center module comprising the spacer layer in a final step. In this way, the lamination operations and roller pressure applied to the spacer layer will be as few and as low as possible. The idea is thus to minimize the time and magnitude of lamination pressure applied to the center part of the material, such as a weaker, low-density spacer layer material.

In a particular embodiment, an outside paper facing layer should be first laminated to the bulk layer, in order to be pre-cut together when making a pre-cut hole, opening or slit, such as a perforation, in the thicker, bulky parts of the material, as is today done in the conventional paperboard bulk layer. Such a pre-cut hole, opening or slit will thus be encapsulated between laminate layers that are laminated in subsequent operations, including the inside layers and a paper facing layer, a metal foil or a barrier-coated film.

There is a particular advantage by such a packaging laminate having a paper facing layer on the inside of the bulk layer, when the laminate has a pre-cut hole in the bulk (and in the outside material facing layer), in the improved openability of the laminated membrane consisting of the other laminate layers within the pre-cut hole region. An opening device, normally has a cutting or slitting feature such that the membrane across the pre-cut hole is cut or torn open when twisting/turning the cap or screw cork, of the opening device, or pushing-through with a drinking straw. If there is too high cutting or slitting resistance in the laminated membrane the attached opening device of the package will become difficult to open, such as when very strong polymer films or layers are used as material layers in the membrane. Also, if there is low adhesion between the layers of the laminated membrane, there will be delamination and torn edges of the materials, not looking very good after opening. When using paper facing layer on the inside of the bulk layer, the laminated membrane will be mechanically stable and of high laminated quality, i.e. be without any ruptures or delaminations between the layers, before or after opening. In addition, if the paper facing layer is a high-density, compact surface paper, such as a greaseproof paper, also being quite thin, it is particularly easy to cut or slit open, and seems to have perfect properties for such tearing or slitting or cutting openability. The paper provides stability to the membrane during lamination, thus resulting in a well laminated membrane, but also while cutting the membrane open by the opening device. Thus, the cut will be clean and provide a clean cut edge and be easy to make without too high resistance when turning the screw cork open.

The laminated packaging material obtained by the method of the invention is thus a three-modular sandwich material, comprising a cellulose-based spacer layer and at least one mechanically stabilizing facing layer of relatively thin high-density paper layers on a side of the spacer layer, the laminate further comprising functional layers having various barrier properties and heat sealing properties.

The spacer layer may according to an embodiment be a layer that creates a distance or space between significantly thinner material layers, which have a higher Young's modulus and density, such as a high-density paper layer arranged on each side of the spacer layer, i.e. stiffness- and stability-providing layers, so-called facing layers. Further layers may be arranged on the sides of the spacer layer, contributing to the total sandwich construction, but according to this invention, we are mainly talking about paper facing layers. The spacer layer may have a lower or no inherent bending stiffness and thus does not itself contribute directly to the bending stiffness or strength of a laminated packaging material. Indirectly, it may contribute very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. When the spacer layer has very low density and is not contributing itself by any bending stiffness property, one paper facing layer on each side of the spacer layer is needed. When the distance between the paper facing layers is increased, also the mechanical strength and bending stiffness of the laminated sandwich structure will be increased.

Suitable cellulose-based materials for spacer layers may be for example so-called foamed cellulose, i.e. foam-formed fibrous cellulose, which is a fibrous material, with tunable density, that can be manufactured by a foam forming process.

A bulk layer comprising foamed cellulose thus has a density lower than 700 $kg/m^3$, such as from 100 to 600 $kg/m^3$, such as from 100 to 500 $kg/m^3$, such as from 200 to 500 $kg/m^3$, such as from 200 to 400 $kg/m^3$, such as from 300 to 500 $kg/m^3$, such as from 300 to 400 $kg/m^3$. The lower the density of the foamed cellulose layer, the higher cost-efficiency regarding raw materials consumed, while better resistance to thickness reduction properties of a foamed cellulose was obtained at above 300 $kg/m^3$. According to an embodiment, the optimal density of foamed cellulose to be used in laminated packaging materials has been concluded to be from 300 to 500 $kg/m^3$, in particular from 300 to 400 $kg/m^3$.

Accordingly, the method of the invention enables the incorporation of a foamed cellulose bulk material into a laminated packaging material suitable for preparing packaging containers for food products, especially for liquid and semi-liquid food products. Lamination of such a bulk layer to polymer layers may be carried out by melt extrusion operations, like extrusion coating and extrusion lamination of the polymer layers. The extrusion is generally done at high temperatures such as, in the case of molten low density polyethylenes, up to about 330° C. Such temperatures have been shown not to become a major problem for a bulk layer comprising foamed cellulose, contrary to the case of bulk layers of other foamed polymer layers. The foamed cellulose is fairly thermally stable above 300° C. and has a low heat transfer, as opposed to foamed polymer layers in general, and foamed polyolefins in particular. It has been seen that at relatively low densities of from 300 to 400 $kg/m^3$, foamed cellulose does not significantly lose thickness in extrusion lamination operations, and maintains sufficient delamination strength or so-called z-strength, for use in packaging laminates for the purpose of the invention.

The bulk layer comprising foamed cellulose as described in aspects and embodiments herein, further provides the desired strength against delamination, i.e. it does not easily delaminate under standard conditions. The delamination strength can be determined by for example the Huygen Internal Bonding Energy testing device which follows TAPPI T569 and provides a value of $J/m^2$ where the packaging material herein is between 60-300 $J/m^2$, such as 60-250 $J/m^2$, such as 80-200 $J/m^2$, such as 140-200 $J/m^2$. In some aspects and embodiments the bulk layer is providing a distance between a barrier layer and an outermost thermoplastic decor layer, and is thereby enabling tailor-made laminated packaging material structures. In some embodiments the bulk layer comprising foamed cellulose provides delamination strength in combination with compression strength in the thickness (Z- or ZD) direction, and provides sufficient distance between the barrier layer and the decor layer.

Foamed cellulose can be generated by mixing cellulose fibers and a foaming fluid, such as water and optionally a surfactant such as sodium dodecyl sulphate (SDS). The amount of the surfactant should be 0.1 w % to 20 w %, such as 0.5 w % to 10 w %, such as 1 w % to 5 w % such as 1.5 w %-3 w %. A rotor mixer on a general foam-generator generates the foamed cellulose. The foam is generally formed by bringing a gas into the mixture. Air is an example of an appropriate gas. Another suitable gas is oxygen. Generally the gas is brought into the mixture by pressurized gas and by the vortex caused by stirring. Generally the cellulose is provided as a liquid dispersion comprising cellulose fibers. An example of liquid is water. Some examples of cellulose fibers are cellulose based fibers such as chemical pulp fibers, chemi-thermomechanical pulp fibers, thermo-mechanical pulp fibers, and Kraft pulp fibers. The fibre dispersion may for example be added to the foaming fluid after a foam has been generated by the fluid (including the surfactant). Optionally, the liquid dispersion comprising cellulose fibers may be combined with the foaming fluid prior to foaming. An additive, for controlling the consistency of the foam may be added, if necessary. The foamed cellulose generated as described herein is run through a nozzle arrangement ("headbox") where pressure and forming tools generate a web of foamed cellulose which is rolled onto a reel, after at least partly drying, and stored before future use to prepare for example a packaging material. Optionally the foamed cellulose web can be used in-line, i.e. directly applying additional layers in order to transform the foamed cellulose web to a laminated packaging material for liquid or semi-liquid food packaging. Compared to traditional paper manufacturing, additional or modified drying may suitably be used in order to achieve the desired dryness and density.

In some embodiments the foamed cellulose may be mixed with other materials, for example additives, and/or microfibrillar cellulose, and/or refined pulp, and/or strength chemicals or agents, such as starch and derivatives thereof, mannogalactans, carboxymethyl cellulose, melamine-formaldehyde colloids, urea-formaldehyde resins, polyimide-polyamine-epichlorhydrin resins.

Another example of a spacer layer is made from so-called container board material, which normally has a quite high density but a lower inherent bending stiffness, as well as other differences in mechanical properties, in comparison to conventional liquid packaging paperboard, such that the dimensional and mechanical stability and thus the integrity and barrier properties of packages made from a laminate having a bulk layer of such a material, would be deteriorated, when made by conventional manufacturing of a packaging laminate.

In particular, containerboard layers have a substantially lower bending stiffness itself compared to a laminated packaging material suitable for liquid packaging. Generally, fluting materials have a higher bending stiffness per grammage than linerboard materials.

Bending stiffness is not commonly measured on containerboard materials, since they were anyway intended for corrugated carton manufacturing, but it has been measured that such materials have a bending stiffness at least 30%, such at least 40% such at least 50% lower, than the bending stiffness of a liquid carton paperboard, at a corresponding grammage when excluding the printable coating (clay-coat) grammage. Containerboard still contributes to the total mechanical properties and bending stiffness of a laminated packaging material, however, by also providing a distance layer in a sandwich construction between facing layers, which have a higher Young's modulus, and by having higher compression strength properties in the in-plane (x-y) of the layer, than conventional paperboard for liquid packaging.

Containerboard is also known as corrugated case material (CCM), and the materials needed for a corrugated case material are a corrugated medium (or fluted medium) which is, in use, fluted (welled) and then arranged by glueing between two flat linerboards or liner mediums. Such a corrugated construction provides a high sandwich structure bending stiffness, due to the fluted intermediate layer, which is acting as a distance or spacer layer between the two, relatively thinner, liner layers. The two types of paper that make up containerboard are thus linerboard material, also commonly called Kraft liner or Test liner, and fluting (or corrugating medium) material.

The two types of paper that make up containerboard are linerboard material and fluting (or corrugating medium) material. Since containerboard is made mainly out of natural unbleached cellulose fibres, it is generally brown or beige, although its shade may vary depending on the type of cellulose. There are, however, also white top linerboards, which have a white top layer on one surface and which are normally more expensive materials.

Liner board normally has a density lower than 850 kg/m3, such as lower than 835 kg/m3, is brown or beige and comprises mainly softwood fibres, such as spruce and pine fibres.

Fluting is thus a paper product normally used as corrugating medium in corrugated container-paperboards, having a density from 600 to 750 kg/m$^3$, such as from 600 to 700 kg/m$^3$, normally around 650 kg/m$^3$. Fluting paper is brown or beige and contains mostly short fibres, and is generally, just like linerboard, a very low-cost, low-quality paper, that is not in itself suitable for manufacturing of liquid carton packages. However, when used as a spacer layer in a sandwich structure, it may work well for the purpose, and at a substantially lower price, if of an approved kind and combined in the right way with the right layers in such a packaging laminate.

The fluting medium would, however, form a spacer layer, which is non-fluted, by being a lower-stiffness, lower-cost fibrous material that may provide sufficient distance in a sandwich construction for a laminated liquid carton packaging material. Fluted spacer layers, i.e. well-formed spacer layers, are not within the scope of the present invention. Corrugated carton materials would pose quite different technical implications and requirements to liquid carton laminated packaging materials, and will not be dealt with here.

The fibres generally used in the manufacture of containerboard materials can be broadly classified into two main types, recycled fibres and new, i.e. virgin fibres. The properties of paper are dependent on the structural characteristics of the various fibres that compose the sheet. Generally speaking, the higher the content of virgin fibres, the stronger and stiffer (higher compression resistance) the fluting or linerboard material will be. The fluting material that has been explored for the purpose of this invention is a semi-chemical fluting made of 100% primary fibres made of hardwood, such as birch, from Powerflute. Birch is the optimal fluting raw material. Its structure contains high concentrations of lignin and hemicellulose. The pulping process conserves the naturally highly hydrophobic lignin and modifies the remaining hemicellulose so that the soft and flexible cellulose core of the fibre is protected. This provides a higher stiffness and creep properties. When used for liquid packaging, the available fluting materials on the market need to be complemented with one or more additional sizing agent during pulping or cellulose web manufacturing, in order to cope with the liquid and high-moisture conditions for this new use and application. Conventional sizing technologies and chemicals (AKD, ASA, rosin, etc.) can be used for the fluting material in order to meet the necessary requirements for the specific product.

Linerboard made of virgin fibres, is called kraft liner, whereas linerboard from recycled fibres is known as testliner. Also mixes of virgin and recycled fibres are possible. Kraft linerboard should have at least 80 wt %, and preferably 100 wt % of virgin fibres. The fibres used for linerboard are longer than those used in fluting material, and since linerboard is originally intended for the outer, liner layers of a carton material, they are also sized with sizing agents in order to withstand different degrees of moisture and wet conditions.

Containerboard materials thus have lower bending stiffness than corresponding paperboards for liquid packaging, but have, on the other hand, a higher SCT index, i.e. a higher SCT value per grammage unit in the machine direction (MD), than a normal liquid paperboard material, or than other paper or cellulose materials that would be suitable in this context. Containerboard in general have a bending stiffness which is at least 30% lower than the bending stiffness of a liquid paperboard, which has a corresponding grammage, when excluding the printable coating (clay-coat) grammage. Generally, fluting materials have a higher bending stiffness per grammage than linerboard materials.

The SCT value is a property measured by the international standard ISO9895, and which is relied on to compare different containerboard materials with each other. The SCT or Short Compression Test measures the internal compression resistance of paper fibres, i.e. the in-plane compression strength of a paper, in CD and MD. This property varies with the grammage of the specific paper measured on. Grammage of paper products is measured according to ISO 536.

Packages made from a material having a higher SCT index, have better stackability, and it is thus a measurement of compression strength per grammage in the in-plane (x-y plane) of a carton material. Containerboard materials normally have an SCT index of more than 30 Nm/g in MD, and would thus provide i.a. the required compression strength and stackability properties for a liquid paperboard laminate. These materials do not need to be optimised regarding bending stiffness properties, since they will only be used as (non-fluted) spacer layers in laminated materials for liquid carton packaging. Thus, whereas such linerboard materials originally are intended for facing layers in a corrugated carton sandwich structure, they will for the purpose of the present invention be used as the spacer layer in a laminated structure, having further facing layers laminated on each side thereof, in order to provide the required bending stiffness properties for liquid carton laminated materials.

For comparison, today's liquid paperboard materials have an SCT index of about 25 Nm/g, but are then also optimised regarding all other properties, since they are relied on as the main provider of dimensional stability in liquid carton laminated packaging materials. When replacing today's optimised liquid paperboard with a low-cost spacer layer in a sandwich structure in a laminate, such a spacer layer needs to have a higher SCT index, of above 30 Nm/g, in order to compensate for the loss of properties when removing the state-of-the-art paperboard.

Since the new spacer layer will be laminated to further facing layers in a sandwich configuration in a laminate structure, there is no need to provide a white or smooth (e.g. clay-coated) printing surface on the spacer layer itself. Also in that respect, the container board materials are thus suitable materials for such a spacer layer.

Regarding moisture resistance, these materials may have a Cobb water adsorption value of lower than 35 g/m2, in order to function better in a liquid carton packaging laminate. The Cobb value is measured according to ISO 535, and is fulfilled by most linerboard materials already, while some fluting materials may need additional sizing in order to be used as a non-fluted spacer layer in a liquid carton packaging laminate. Accordingly, a containerboard material in a bulk layer, comprises at least one sizing additive.

In a further embodiment, the spacer layer may comprise a combination of different cellulose or paper types. If the spacer layer comprises foamed cellulose, the foamed cellulose part is at least 20%, such as at least 25% such as at least 30%, such as at least 40% of the thickness of the bulk layer. The percentages may be determined by examining the cross-section of the packaging material in a microscope.

In another embodiment, the bulk layer may be mainly comprised of a spacer material layer, but in addition comprises one or two integrated paper layer(s) having a relatively higher Young's modulus but lower thickness than the spacer layer, in order to provide some flexural strength and bending stiffness to the finally produced laminated material.

The final laminated material may thus comprise at least one such relatively thinner and stiffer paper arranged on each side of the spacer layer. With such an arrangement, the thinner and stiffer papers act similarly to flanges of an I-beam construction or to facing layers of a sandwich construction, thus stabilizing the sandwich mechanically, e.g. regarding bending stiffness, and in-plane compression strength in various directions within the material.

Suitable such paper facing layers may be found among thin Kraft papers, greaseproof papers or parchment papers. They should have a grammage from 20 to 100 g/m$^2$, such as from 30 to 70 g/m$^2$, such as from 30 to 60 g/m$^2$ and a density from 600 to 1500 kg/m$^3$.

Typically, the paper facing layers should have a Young's modulus from 1 to 10 GPa such as from 5 to 10 GPa.

Paper facing layers may be included in the laminated material structure in different ways. For example, when the spacer layer has higher density and inherent stiffness by itself, such as a containerboard material spacer layer, the bulk material layer may comprise the containerboard material layer and a thinner, stiffer or more high-density paper facing layer on one side of the spacer layer. It may then be sufficient for the final laminated material to just have one such paper facing layer on one side, and to have a less stabilizing facing layer of a different material such as an oriented plastics film, on the other side of the spacer layer. Alternatively, a paper facing layer may be included in one of the in- or outside material modules to be laminated to the fluting material layer.

The bending stiffness of a packaging material laminate may be derived from the thicknesses and the Young's moduli of the individual layers. For balancing mechanical properties of a sandwich laminated material structure, the facing layers of the sandwich should be arranged on each, respective, side of the spacer layer, such that they have substantially equal extensional stiffness. The extensional stiffness is given by the product of Young's modulus and thickness. This may be regulated by varying the thickness and the Young's modulus of the papers, and where there are more than one such paper facing layers on the one side of the spacer layer, it is possible to calculate the total bending stiffness of that particular combination of facing layers.

Various specific embodiments are conceivable according to the invention. The bulk material may comprise a spacer layer of fluting having a density from 600 to 700 kg/m$^3$, while the outside material module comprises a paper facing layer. Alternatively, the bulk material may comprise a spacer layer and an integrated paper facing layer on the inside of the spacer layer, the spacer layer being so-called fluting having a density from 600 to 700 kg/m$^3$.

By tailor-making the sandwich structure such that a thicker paper facing layer on the outside can be separated from the spacer layer and at the same time constitute a print substrate layer, which allows differentiation of print background colour, texture and pattern, and an as thin as possible, but having a higher Young's modulus barrier coating substrate paper for laminating in the inside material module, the barrier coating process efficiency can also be increased, by using thinner substrate and thus fewer substrate rolls in e.g. a vacuum coating process. The asymmetry in paper facing layer properties may be balance by other layers in the structure, such that symmetry vs the center line of the spacer layer still is obtained and curling may be avoided.

In an embodiment where the bulk layer comprises foamed cellulose, the final laminated material comprises one paper facing layer arranged on each side of the spacer layer, in order to provide sufficient stability to the final laminated packaging material.

In an embodiment, the bulk material comprises a spacer layer and an integrated paper facing layer on the first side (the inside) of the spacer layer, while the outside material module also comprises a paper facing layer, to be laminated to the second side (the outside) of the bulk and spacer layer. In another embodiment, the bulk material layer comprises a spacer layer and an integrated, paper facing layer on the second side of the spacer layer, while the inside material module also comprises a paper facing layer, to be laminated to the first side of the bulk and spacer layer.

In a further embodiment, the bulk material comprises a spacer layer and one integrated, paper facing layer on each side of the spacer layer.

In a different embodiment, the bulk material comprises a spacer layer, or a combination of two or more different spacer layers, while the in- and outside material modules, to be laminated to the first and second side of the bulk layer, comprise a paper facing layer each, or an oriented polymer film.

In a particular embodiment, the spacer layer is a fibrous layer made by a foam-forming process and has a grammage of 150 g/m$^2$ and a thickness of 600 μm and has a high-density paper of a grammage of from 60 to 80, such as 70, g/m$^2$ arranged on each side thereof.

According to an embodiment, the outside material module comprises a paper facing layer having a printable or printed surface directed towards the outer side of the module, and is laminated to the outside surface of the bulk material by an intermediate bonding layer or adhesive.

In an another embodiment, the outside material module is a polymer film having a printable or printed surface, the film being laminated to the outside surface of the bulk material by an intermediate bonding layer or adhesive.

In a further embodiment, the outside material module comprises a polymer film having a printable or printed surface and a paper facing layer, to which the polymer film is further laminated, the module being laminated to the outside surface of the bulk material by an intermediate bonding layer or adhesive.

By removing the decorative function of today's bulk layer, i.e. the white printable surface onto which a colour décor pattern may be printed as well as at least some of its bending stiffness, from the bulk layer, and instead laminating a low quality bulk layer to a separate print substrate layer on the outside of the bulk layer, greater flexibility in the manufacturing process of differently appearing packaging laminates may be provided at a lower cost and at a shorter lead time from order to delivery. Accordingly, it becomes easier to change the outer appearance of packaging containers, without affecting the manufacturing process or the raw materials other than by merely exchanging the print substrate and the actual printed décor pattern. A print substrate layer may be white, brown, coloured, metallised etc. At the same time, mechanically and dimensionally stable packaging containers with a good appearance will still be obtained, thanks to the sandwich effect of the layers of the laminate as a whole.

In an embodiment, the inside material module comprises a paper facing layer having a barrier coating, and is laminated to the inside surface of the bulk material by an intermediate bonding layer or adhesive.

In another embodiment, the inside material module is a polymer film having a barrier coating, the film being laminated to the inside surface of the bulk material by an intermediate bonding layer or adhesive.

In a further embodiment, the inside material module comprises a polymer film as well as a paper facing layer, to which the polymer film is further laminated, the film or the paper having a barrier coating, the module being laminated to the inside surface of the bulk material by an intermediate bonding layer or adhesive.

In another embodiment, the inside material module comprises an aluminium foil.

Accordingly, also inside differentiation of the barrier functionalities may be varied, depending on how to balance the center and outside material modules, and depending on requirements of the food product to be packed.

Suitable print substrate polymer films may be a stabilizing stretched and pre-manufactured polymer film, selected from the group consisting of films based on any of polyesters, such as polyethylene terephthalate (PET), oriented or non-oriented PET (OPET, BOPET), oriented or non-oriented polyethylenefuranoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

In a further embodiment, the print substrate has a printable surface which is a clay-coated white paper surface or a metallised film or paper surface.

The outside material module may be laminated to the bulk material by applying an aqueous adhesive composition at an amount from 0.5 to 4, such as from 1 to 3 g/m$^2$ to one of the surfaces to be adhered to each other, and subsequently pressing them together.

The inside material module may be laminated to the bulk material by applying an aqueous adhesive composition at an amount from 0.5 to 4, such as from 1 to 3 g/m² to one of the surfaces to be adhered to each other, and subsequently pressing them together.

The final laminated packaging material of the invention is normally not containing an aluminium foil as a barrier material. If an aluminium foil were to be included in the first pre-laminated material on the first side of the bulk layer, it would inherently add some stiffness and mechanical strength to the final sandwich structure, i.e. the final laminated packaging material. Assuming, however, that future packaging materials aim for lower carbon dioxide consumption in manufacturing, and thereby for no or less content of aluminium barrier material, i.e. for so-called non-foil laminated packaging materials, a laminate based on a bulk layer having a spacer layer comprising foamed cellulose of significantly lower density and bending stiffness than today's liquid packaging paperboard, the mechanically stabilizing paper facing layer on each side of the spacer layer would be a better choice in the laminated structure. Furthermore, it has been seen that a symmetric arrangement with a paper facing layer on each side of the spacer layer is advantageous because it reduces the increase of curling of the laminated packaging material with increasing moisture content, and further improves the compression strength of packaging containers made from the material, i.e. there will be fewer "buckled" packages from stacking packaging containers on top of each other in transport and distribution on pallets.

In laminating the two webs of the in- and outside material modules to the web of the bulk layer, different methods and laminating materials may be used. Melt extrusion lamination with an interjacent molten thermoplastic bonding polymer has been mentioned above, and is a common way of laminating two webs to each other. In an embodiment of the invention, where the surfaces to be laminated to each other are all paper or cellulose-based surfaces, there will be good resulting adhesion between the laminated surfaces. Some types of surfaces may require an oxidizing pre-treatment of the surface before adhering to the other surface, or alternatively, or in addition, the bonding polymer to be melt extruded may at least partly comprise an adhesive thermoplastic polymer, i.e. a polymer having functional groups with affinity to various surface, normally carboxylic or maleic anhydride groups.

Suitable adhesive polymers for the bonding layers interior of the laminated material, i.e. between an outer heat sealable layer and the barrier- or primer-coated substrate layer, or for bonding the barrier film to the bulk layer in a mono- or multilayer such bonding laminate layer, are the so-called adhesive thermoplastic polymers, such as modified polyolefins, which are mostly based on LDPE or LLDPE copolymers or, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

Corresponding modified polypropylene-based thermoplastic adhesives or bonding layers may also be useful, depending on the requirements of the finished packaging containers.

Such adhesive polymer layers or tie layers are normally applied together with the respective outer layer or further bulk-to-barrier bonding layers in a co-extrusion coating operation.

The adhesive may be applied as an aqueous adhesive solution or composition, and it is applied onto one of the surfaces to be laminated to each other, and then joined with the other surface in a lamination station, involving one or more lamination roller nips. Preferably, in order to apply as little pressure to a weaker, low-density spacer layer as possible, there should be only one lamination nip in the lamination station. It is possible, however, that several, consecutive nips may be advantageous in some embodiments, by applying a lower nip pressure but in several consecutive roller nips, or in one extended nip, in order to enhance adhesion.

The laminated packaging materials may thus have a higher content of fibres and materials from renewable resources, which is advantageous from an environmental point-of-view. Furthermore, by an increased proportion of cellulose fibres in the material, it may become easier to handle in recycling processes, in particular when also the proportional amount of thermoplastic polymer layers and aluminium foil simultaneously may be decreased. This is for example one advantageous effect, when lamination of cellulose-based modules may be done by aqueous adhesive absorption lamination, i.e. a lamination method wherein only a very low amount of polymer adhesive is applied and binding the two surfaces to be laminated together, while the aqueous medium or solvent is absorbed into the cellulose fiber network of the laminated layer(s) and no further drying or heating is needed. Thus, while less thermoplastic bonding material is needed, such as in melt extrusion lamination, the amount of paper or cellulose-based material layers is increased and furthermore, the barrier layers may be downgauged, due to efficient combinations of properties of the various material layers included in the laminated packaging material.

Suitable thermoplastic polymers for the outermost and innermost heat sealable liquid-tight layers in the laminated packaging material of the invention, are polyolefins such as polyethylene and polypropylene homo- or co-polymers, preferably polyethylenes and more preferably polyethylenes selected from the group consisting of low density polyethylene (LDPE), linear LDPE (LLDPE), single-site catalyst metallocene polyethylenes (m-LLDPE) and blends or copolymers thereof. According to a preferred embodiment, the outermost heat sealable and liquid-tight layer is an LDPE, while the innermost heat sealable, liquid-tight layer is a blend composition of m-LLDPE and LDPE for optimal lamination and heat sealing properties. The outer- and innermost thermoplastic polymers layers may be applied by (co-)extrusion coating of the molten polymer to a desired thickness. According to another embodiment, the outer- and/or innermost liquid-tight and heat sealable layers may be applied in the form of pre-manufactured, oriented or non-oriented films.

According to another embodiment, the outermost heat-sealable, liquid-tight and protective thermoplastic polymer layer may be applied by means of an aqueous dispersion coating of a thermoplastic polymer, such as when only low thickness of such an outermost layer is desired, or when such a process is preferable for other reasons.

The same thermoplastic polyolefin-based materials, in particular polyethylenes, as listed above regarding the outermost and innermost layers, are also suitable in bonding layers interior of the laminated material, i.e. between a bulk or core layer, such as paper or paperboard, and a pre-laminated material, including a barrier film or another film layer.

Suitable barrier layers may thus involve a film or paper substrate having a barrier coating, such as a dispersion coated or liquid film coated barrier coating, or a vapour deposited barrier coating.

A suitable film substrate for such barrier films may be a polymer film selected from the group consisting of films based on any of polyesters, such as polyethylene terephthalate (PET), oriented or non-oriented PET (OPET, BOPET), oriented or non-oriented polyethylenefuranoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

Barrier properties may be provided by a polymer layer or multilayer, or a film from one or more barrier polymers, while in other embodiments the polymer of the film is only for the purpose of providing a substrate for a subsequently applied barrier coating. The most important barrier property in aseptic, long-term packaging, is the oxygen barrier property. Oxygen barrier properties may thus further be provided by thin liquid film coatings, for example barrier polymers that are coated in the form of a dispersion or solution in a liquid medium or solvent, onto a substrate, and subsequently dried into thin barrier coatings. It is important that the dispersion or solution is homogeneous and stable, to result in an even coating with uniform barrier properties. Examples of suitable polymers for aqueous compositions are polyvinyl alcohols (PVOH), water-dispersible ethylene vinyl alcohols (EVOH) or polysaccharide-based water-dispersible or dissolvable polymers. Such dispersion coated or so called liquid film coated (LFC) layers may be made very thin, down to tenths of a gram per $m^2$, and may provide high quality, homogenous layers, provided that the dispersion or solution is homogeneous and stable, i.e. well prepared and mixed. PVOH has excellent oxygen barrier properties under dry conditions and also provides very good odour barrier properties, i.e. capability to prevent odour substances from entering the packaging container from the surrounding environment, e.g. in a fridge or a storage room, which capability becomes important at long-term storage of packages. Furthermore, such liquid film coated polymer layers from water-dispersible or -dissolvable polymers often provide good internal adhesion to adjacent layers, which contributes to good integrity of the final packaging container.

Suitably, the polymer is selected from the group consisting of vinyl alcohol-based polymers, such as PVOH or water dispersible EVOH, acrylic acid or methacrylic acid based polymers (PAA, PMAA), polysaccharides such as for example starch or starch derivatives, cellulose nanofibrils (CNF), nanocrystalline cellulose (NCC), chitosan or other cellulose derivatives, hemicelluloses, water dispersible polyvinylidenechloride (PVDC) or water dispersible polyesters, or combinations of two or more thereof.

More preferably, the polymer binder is selected from the group consisting of PVOH, water dispersible EVOH, acrylic acid or methacrylic acid based polymers (PAA, PMAA), polysaccharides such as for example starch or starch derivatives, chitosan or other cellulose derivatives, or combinations of two or more thereof.

Such barrier polymers are thus suitably applied by means of a liquid film coating process, i.e. in the form of an aqueous or solvent-based dispersion or solution which, on application, is spread out to a thin, uniform layer on the substrate and thereafter dried.

Aqueous compositions generally have certain environmental advantages. Preferably, the liquid gas barrier composition is water-based, because such composition usually have a better work environment friendliness than solvent-based systems, as well.

As briefly mentioned above, a polymer or compound with functional carboxylic acid groups may be included, in order to improve the water vapour and oxygen barrier properties of a PVOH coating. Suitably, the polymer with functional carboxylic acid groups is selected from among ethylene acrylic acid copolymer (EAA) and ethylene methacrylic acid copolymers (EMAA) or mixtures thereof. One particularly preferred barrier layer mixture consists of PVOH, EAA and an inorganic laminar compound. The EAA copolymer is then included in the barrier layer in an amount of about 1-20 weight %, based on dry coating weight. Other examples of polymer binders providing oxygen barrier properties, suitable for liquid film coating, are the polysaccharides, in particular starch or starch derivatives, such as preferably oxidised starch, cationic starch and hydroxpropylated starch. Examples of such modified starches are hypochlorite oxidised potato starch (Raisamyl 306 from Raisio), hydroxypropylated corn starch (Cerestar 05773) etc. However, also other starch forms and polysaccharide derivatives may provide gas barrier properties at some level.

Most preferably, however, the gas barrier polymer is PVOH, because it has all the good properties mentioned above, i.e. film formation properties, gas barrier properties, cost efficiency, food compatibility and odour barrier properties.

A PVOH-based gas barrier composition performs best when the PVOH has a degree of saponification of at least 98%, preferably at least 99%, although PVOH with lower degrees of saponification will also provide oxygen barrier properties.

According to an embodiment, the liquid composition additionally comprises inorganic particles in order to further improve the oxygen gas barrier properties.

The polymer binder material may for example be mixed with an inorganic compound which is laminar in shape, or flake-formed. By the layered arrangement of the flake-shaped inorganic particles, an oxygen gas molecule has to migrate a longer way, via a tortuous path, through the oxygen barrier layer, than the normal straight path across a barrier layer.

The inorganic laminar compound is a so-called nanoparticle compound dispersed to an exfoliated state, i.e. the lamellae of the layered inorganic compound are separated from each other by means of a liquid medium. Thus the layered compound preferably may be swollen or cleaved by the polymer dispersion or solution, which at dispersion has penetrated the layered structure of the inorganic material. It may also be swollen by a solvent before added to the polymer solution or polymer dispersion. Thus, the inorganic laminar compound is dispersed to a delaminated state in the liquid gas barrier composition and in the dried barrier layer.

Preferred nano-particles are those of montmorillonite, such as purified montmorillonite or sodium-exchanged montmorillonite (Na-MMT). The nano-sized inorganic laminar compound or clay mineral may have an aspect ratio of 50-5000 and a particle size of up to about 5 μm in the exfoliated state.

Suitable inorganic particles mainly consist of such laminar bentonite particles having an aspect ratio of from 50 to 5000.

The barrier layer may include from about 1 to about 40 weight %, more preferably from about 1 to about 30 weight % and most preferably from about 5 to about 20 weight %, of the inorganic laminar compound based on dry coating weight. If the amount is too low, the gas barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system. Preferably, the barrier layer includes from about 99 to about 60 weight %, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating. The total dry content of the composition is preferably from 5 to 15 weight-%, more preferably from 7 to 12 weight-%.

According to a different preferred embodiment, the inorganic particles mainly consist of laminar talcum particles having an aspect ratio of from 10 to 500. The composition may comprise an amount of from 10 to 50 weight-%, more preferably from 20 to 40 weight-% of the talcum particles, based on dry weight. Below 20 weight-%, there is no significant increase in gas barrier properties, while above 50 weight-%, the coated layer may be more brittle and breakable because there is less internal cohesion between the particles in the layer. The polymer binder seems to be in too low an amount to surround and disperse the particles and laminate them to each other within the layer. The total dry content of such a liquid barrier composition from PVOH and talcum particles may be between 5 and 25 weight-%.

Good oxygen barrier properties may be achieved when there is made use of colloidal silica particles, exhibiting a particle size of 3-150 nm, preferably 4-100 nm and even more preferred 5-70 nm, which particles are preferably amorphous and spherical. The use of colloidal silica particles moreover has the advantage that the liquid barrier composition may be applied at a dry content of 15-40 weight %, preferably 20-35 weight % and even more preferred 24-31 weight %, whereby the demand on forcible drying is decreased.

Alternatives of inorganic particles according to the invention are particles of kaolin, mica, calcium carbonate etc.

The preferred polymer binder, also when employing inorganic particles for providing oxygen barrier properties, is PVOH, partly due to its advantageous properties mentioned above. In addition, PVOH is advantageous from a mixing point of view, i.e. it is generally easy to disperse or exfoliate inorganic particles in an aqueous solution of PVOH to form a stable mixture of PVOH and particles, thus enabling a good coated film with a homogeneous composition and morphology.

The oxygen gas barrier layer may be applied at a total amount of from 0.1 to 5 $g/m^2$, preferably from 0.5 to 3.5 $g/m^2$, more preferably from 0.5 to 2 $g/m^2$, dry weight. Below 0.5 $g/m^2$, there will likely not be any effect of further filling and closing of a porous substrate surface and no gas barrier properties achieved at all, while above 5 $g/m^2$, the coated layer will not bring cost-efficiency to the packaging laminate, due to high cost of barrier polymers in general and due to high energy cost for evaporating off the liquid. A recognisable level of oxygen barrier may be achieved by PVOH at 0.5 $g/m^2$ and above, and a good balance between barrier properties and costs is achieved between 0.5 and 3.5 $g/m^2$.

The oxygen gas barrier layer may be applied in two consecutive steps with intermediate drying, as two part-layers. When applied as two part-layers, each layer is suitably applied in amounts from 0.1 to 2.5 $g/m^2$, preferably from 0.5 to 1 $g/m^2$, and allows a higher quality total layer from a lower amount of liquid gas barrier composition. The two part-layers may be applied at an amount of from 0.5 to 2 $g/m^2$ each, preferably from 0.5 to 1 $g/m^2$ each.

Further barrier coatings may also be applied by means of physical vapour deposition (PVD) or chemical vapour deposition (CVD) onto a substrate surface, such as a compact-surface paper substrate or a film material. The substrate material itself may contribute with some properties as well, but should above all have appropriate surface properties, suitable for receiving a vapour deposition coating, and should work efficiently in a vapour deposition process.

Thin vapour deposited layers are normally merely nanometer-thick, i.e. have a thickness in the order of magnitude of nanometers, for example of from 1 to 500 nm (50 to 5000 Å), preferably from 1 to 200 nm, more preferably from 1 to 100 nm and most preferably from 1 to 50 nm.

One common type of vapour deposition coating, often having some barrier properties, in particular water vapour barrier properties, is so called metallisation layers, e.g. aluminium metal physical vapour deposition (PVD) coatings.

Such a vapour deposited layer, substantially consisting of aluminium metal may have a thickness of from 5 to 50 nm, which corresponds to less than 1% of the aluminium metal material present in an aluminium foil of conventional thickness for packaging, i.e. 6.3 μm. While vapour deposition metal coatings require significantly less metal material, they only provide a low level of oxygen barrier properties, at most, and need to be combined with a further gas barrier material in order to provide a final laminated material with sufficient barrier properties. On the other hand, it may complement a further gas barrier layer, which does not have water vapour barrier properties, but which is rather sensitive to moisture.

Other examples of vapour deposition coatings are aluminium oxide (AlOx) and silicon oxide (SiOx) coatings. Generally, such PVD-coatings are more brittle and less suitable for incorporation into packaging materials by lamination. Metallised layers as an exception do have suitable mechanical properties for lamination material despite being made by PVD, however generally providing a lower barrier to oxygen gas.

Other coatings which have been studied for laminated packaging materials may be applied by means of a plasma enhanced chemical vapour deposition method (PECVD), wherein a vapour of a compound is deposited onto the substrate under more or less oxidising circumstances. Silicon oxide coatings (SiOx) may, for example, also be applied by a PECVD process, and may then obtain very good barrier properties under certain coating conditions and gas recipes. Unfortunately, SiOx coatings show bad adhesion properties when laminated by melt extrusion lamination to polyolefins and other adjacent polymer layers, and the laminated material is exposed to wet or highly humid packaging conditions. Special, expensive adhesives or adhesive polymers are needed to reach and maintain sufficient adhesion in a packaging laminate of the type intended for liquid carton packaging.

According to this invention, the vapour deposition coating is an amorphous hydrogenated carbon barrier layer applied by a plasma enhanced chemical vapour deposition process, PECVD, a so-called diamond-like carbon (DLC). DLC defines a class of amorphous carbon material that displays some of the typical properties of diamond. A hydrocarbon gas, such as e.g. acetylene or methane, is used as process gas in the plasma for producing the coating. As pointed out above, it has now been seen that such DLC coatings, provide good and sufficient adhesion to adjacent polymer or adhesive layers in a laminated packaging material under wet testing conditions. Particularly good adhesion compatibility with adjacent laminated polymer layers, i.e. polymer layers which are adherent to or coated onto the DLC barrier coating, has been seen with polyolefins and in particular polyethylene and polyethylene-based co-polymers.

The DLC barrier coating thus provides good barrier and integrity properties to liquid-filled packaging containers made from a packaging laminate comprising a barrier film or barrier paper having the barrier coating, by contributing with good mechanical properties, good barrier properties to various substances migrating through such laminated materials in either inward or outward direction from a filled package, as well as by resulting in excellent adhesion to adjacent polymer layers in a laminate. Accordingly, a barrier film from a substrate layer of a polyester or polyamide, having a DLC barrier coating can provide a packaging laminate and a packaging container with oxygen barrier properties as well as water vapour barrier properties, for long term ambient storage, such as for up to 2-6 months, such as for up to 12 months. In addition, the DLC barrier coating provides good barrier properties to various aroma and flavour substances present in the packed food product, to low-molecular substances possibly appearing in the adjacent layers of materials, and to odours and other gases than oxygen. Moreover, the DLC barrier coating, exhibits good mechanical properties, as coated on a polymer film substrate, when laminated into a carton-based packaging laminate, withstanding lamination and subsequent fold-forming of the packaging laminate and sealing it into filled packages. Polyester and polyamide films provide excellent substrate surfaces for the initiation and the growth of a DLC coating layer, during the vapour deposition coating process. Favourable conditions in the coating process result in improved coating quality, and thus the coating layer may be made thinner and still achieve the desired barrier properties as well as adhesion and cohesion properties.

The crack-onset strain (COS) for a biaxially oriented PET film, coated with a DLC barrier coating, may be higher than 2%, and this can normally relate to the oxygen barrier properties of the coating not starting to deteriorate until straining the film above 2%.

DLC coatings further have the advantage of being easy recyclable, without leaving residues in the recycled content that contain elements or materials that are not naturally existing in nature and our surrounding environment.

The use of the above described adhesive polymers should normally not be necessary for bonding to the DLC barrier coating of the invention. Sufficient and adequate adhesion to polyolefin layers as adjacent layers have been concluded, at a level of at least 200 N/m, such as at least 300 N/m. Adhesion measurements are performed at room temperature with a 180° degrees peel force test apparatus (Telemetric Instrument AB), 24 h after the LDPE lamination. Peeling is performed at the DLC/LDPE interface, the peel-arm being the barrier film. When needed, distilled water droplets are added to the peeled interface during peeling to assess the adhesion under wet conditions, i.e. the conditions when the laminated packaging material has been saturated with migrating moisture through the material layers, from the liquid stored in a packaging container made from the laminated material, and/or by storage in a wet or highly humid environment. The given adhesion value is given in N/m and is an average of 6 measurements.

A dry adhesion of more than 200 N/m ensures that the layers do not delaminate under normal package manufacturing conditions, e.g. when bending and fold-forming the laminated material. A wet adhesion of this same level ensures that the layers of the packaging laminate do not delaminate after filling and package formation, during transport, distribution and storage. The interior bonding polymer layer may be coated directly onto the polymer film substrate having a DLC barrier layer coated thereon, by using common techniques and machines, e.g. those used for the lamination of an aluminum foil, in particular hot lamination (extrusion) of the polymer layer from a molten polymer onto the DLC barrier coating. Also, using a pre-made polymer film and binding it directly to the barrier-coated carrier film by locally melting it, e.g. by applying heat with a hot cylinder or heated roller, is possible. From the above it is apparent that the DLC barrier film can be handled in a similar way to an aluminium foil barrier in the lamination and conversion methods into a laminated packaging material, i.e. by means of extrusion lamination and extrusion coating. The lamination equipment and methods do not require any modification, by for example adding specific adhesive polymers or binder/tie layers as may be required by other plasma coated materials. In addition, the new barrier film including the DLC barrier layer coated thereon can be made as thin as an aluminium foil without adversely affecting the barrier properties in the final food package.

When manufacturing a laminated packaging material of the invention, it has been seen that in asymmetric laminate structures having laminated layer structures with unequal extensional stiffness properties on the two sides of the spacer layer, a problem called moisture induced curling appears, i.e. the flat material does not stay flat when lying on a flat surface, but rolls up such that the edges are raised and bent towards each other above the plane of the flat part of the packaging material. A further advantage with planar laminated side panels in a packaging container, is that the grip stiffness will be improved. This is due to the straight panels being free from initial "imperfection", i.e. deflection. Naturally, there will be fewer problems when running a flat packaging material through the filling machines, than a curled and crooked one.

It has been seen that curling is mainly prevented by matching the paper facing layers on each side of the spacer layer, to have equal total extensional stiffness. By doing so, it has surprisingly been seen that also the compression strength of the laminate in x-y direction will be increased. This means for example that folded packaging containers from the laminated packaging material may be stacked on top of each other during distribution and storage at a higher load than today's marketed liquid food packages.

From this follows, that packages made from such symmetrically dimensioned laminated packaging materials may get an improved package integrity, i.e. the package integrity is improved, and the laminated materials are less prone to be damaged and getting cracks in the barrier layers by mere handling and transport.

If the mechanical properties of the sandwich material are balanced in this way, the various laminated layers, including the barrier layers, which are protecting the packed food against slowly migrating oxygen and other gases and vapours, will also be more resistant to damages and delamination, and as a consequence the integrity of the filled and sealed package is improved also from this point of view.

Thus, a further aspect of improving package integrity, is to improve the adhesion between the various layers. Particularly good initial adhesion is obtained between dispersion- or solution-coated barrier coatings having hydrophilic functionality such as hydroxyl groups and carboxylic groups and adjacent layers such as for example polyolefins and polyethylenes. Also vapour deposited metallised coatings and DLC PECVD coatings have proved to provide very good adhesion properties to adjacent organic polymer layers and films, such that no extra primer or adhesive must be used between these and their adjacent layers in the laminated packaging materials.

Nevertheless, it has been shown that, at least regarding metallised barrier coating layers, further enhanced adhesion by laminating to adjacent layers of tie polymers or adhesive polymers, surprisingly also improves the oxygen barrier properties of the laminated material even further and to a higher degree than could be imagined.

Additional oxygen barrier properties may be provided by further including a layer of a polymer acting as barrier to migrating free fatty acids, such as polyamide in the first pre-laminated material to be laminated to the bulk layer. In particular, when a layer comprising a major portion of polyamide is added on the inner side of a metal barrier layer, this prevents free fatty acids from the packed food product to migrate from the food to the metal barrier layer, and thus the barrier properties of the barrier layer may be kept intact and the adhesion of the inside polymer layers (heat seal) to the metal barrier may be maintained for a longer shelf-life time.

The polyamide barrier layer may comprise 50 weight-% or more of the polyamide and the remainder ethylene vinyl alcohol (EVOH) or polyethyleneterephthalate (PET) or a similar polymer compatible with the polyamide and also providing barrier properties towards free fatty acid migration, and may be applied at an amount from 3 to 12 g/m$^2$, such as from 3 to 10 g/m$^2$ such as from 3 to 8 g/m$^2$, such as from 3 to 6 g/m$^2$, depending on requirements of the food product to filled and the balance with costs of the materials used.

According to a further embodiment, the polyamide barrier layer comprises an aromatic or semi-aromatic polyamide polymer. Such polyamides may provide better barrier properties towards migrating free fatty acids, why such a combination is particularly advantageous for packaging of fruit juices and the like. However, the most common polyamide suitable for the purpose of cost efficient laminated packaging materials and easy manufacturing of such coextrusion coated laminate structures is PA-6.

Alternatively, the substrate for the barrier coating may be a relatively thin paper having a relatively higher density and Young's modulus than the bulk layer and the spacer layer. Such a barrier substrate paper may be a same paper as a paper facing layer of the sandwich laminated packaging material, or an additional such paper of a different nature than used in the paper facings.

A particularly well functioning such barrier coating substrate paper may be greaseproof paper or high-density paper having a smoothened and pre-coated surface for subsequent barrier coating, in particular vapour deposition barrier coating. Of course, such a paper facing layer would then contribute further to the oxygen barrier of the final packaging laminate.

According to yet a further embodiment, a package that is based on biological, renewable materials as far as possible, may be obtained.

For example a packaging material can be produced, which has cellulose-based spacer and bulk layers, paper facing layers having barrier properties and further comprising very thin, nano-thin, barrier coatings. Moreover, the thermoplastic polymers can be produced from vegetable or organic material, such as so-called green polyethylene.

In addition, the adhesives or adhesive polymers used in the lamination operation into the final laminated packaging material may be entirely bio-sourced and used only in very low amounts, which increases the relative proportion of renewable, and also cellulose fibre, content even further.

According to a second aspect of the invention, a laminated packaging material is obtained, as produced by the method of the invention.

According to a third aspect, there is provided a packaging container from the laminated packaging material produced by the method of the invention.

According to a further embodiment of the laminated packaging materials obtained, the outermost heat sealable layers of the laminated material may be provided as one or two pre-manufactured films. Thus, such a film may be pre-laminated to the barrier layer, in a first pre-laminate material to be laminated to the first side of the bulk layer, and/or pre-laminated to a printed and decorated outside surface layer to be laminated to the second side of the bulk layer. When films are pre-laminated to barrier layers or printed, decorated layers, it may be done by means of mere heat-pressure lamination of the films to the other layers, especially if a pre-coated or integrated layer of an adhesive polymer such as EAA or EMAA is present on one of the lamination surfaces. Alternatively, it may be done by means of melt extrusion lamination, which is probably more expensive due to the higher consumption of interjacent melt extrusion polymer, or by pre-coating with a small amount of an aqueous adhesive that may penetrate into the at least on paper or cellulose-based surface to be laminated, without any drying step needed.

Within the general quest of lowering costs of laminated packaging materials, it is highly desired to combine properties in the various layers such that as few as possible additional layers will be needed.

When the conventional liquid packaging paperboard of today's packaging laminate is replaced by weaker bulk layers, enabling significant cost savings, some additional costs may instead be spent on various tailor-made décor substrates for printing and decorating the laminated packaging material. Since the bulk layer of the invention will no longer constitute a print-surface, i.e. a surface to be printed, the expensive clay-coat may be omitted from the bulk layer, and a smooth and white print surface may be obtained by other means, on the outside print substrate facing paper, to be laminated to the outer side of the bulk layer. Such a print substrate may for example be a coloured or metallised film or a white printable paper facing layer. Alternatively, a white paper for providing the white print background surface may be pre-laminated to a transparent film, which is printed before laminating on its back-side, i.e. a reverse printed film, such that the printed décor is directed towards the white paper surface and protected by the transparent film substrate. Thus, the printing and the lamination to an outside white, paper facing layer and possibly the further lamination to outermost heat sealable layers may take place in a prior lamination operation in order to provide the second pre-laminated material for the second side, the outside, of the laminated packaging material.

In order to further provide light barrier properties and whiteness, such a film or paper may comprise white filler material or in the case of paper a clay-coat, also or instead, a metallised layer. In particular, in order to minimize complexity in production and logistics, the same outside print substrate, film or thin paper, could be used for multiple end products, by for example having one metallised side and the other side being white or coloured. For some products and appearances of the packaging containers, a metallised print surface is preferred, and in other cases a coloured print surface or a brown, natural cellulose print surface. By detaching the print surface layer from the bulk layer, versatility in possible outside appearances becomes possible and this is a further advantage of the three-part modular lamination model of this invention. Even further oxygen barrier layers may be included in the second pre-laminated material in order to enhance the total barrier performance of the final laminated material.

In FIG. 1a, there is thus shown, in cross-section, a first embodiment of a laminated packaging material, 10a, of the invention. It is in principle a laminate composed from three initial modules of material layers that contribute to the sandwich structure that substantially provides the laminated material with its mechanical strength properties and provides a final packaging container with dimensional stability. Module 1A is a center layer of a bulk material from a spacer layer 11a of low-density cellulose material, such as a foam-formed fibrous cellulose layer or a layer of a fluting material, or with any combination of a higher density paper or cellulose-based product with a foamed cellulose or fluting material. In this particular embodiment, a foamed cellulose layer of 150 g/m$^2$ is used as spacer layer.

The outside material module 1B comprises a print substrate layer of a thin, high-density paper 12a having a print surface. The paper 12a also constitutes a facing layer on the outside of the sandwich structure in interaction with the spacer layer 11a. In the final laminated material, the substrate 12a is printed and decorated with a print pattern from various colours, images and text. The outside material module 1B also comprises an outermost liquid-tight and transparent layer 16a of a plastic, preferably a heat sealable thermoplastic, such as a polyolefin, such as a polyethylene material layer. The print substrate and paper facing layer 12a may be printed before or after lamination to the center spacer layer, and the outermost plastic layer 16a is applied onto the printed substrate layer in a separate operation before or after lamination to the spacer layer 11a. If decor printing coating with the plastic layer 16a takes place before lamination to the center module spacer layer, the whole outside material module is thus prepared as one module, i.e. as a pre-made outside, which is then laminated to the center module or to the rest of the laminate, on the outside of the center spacer layer. The lamination operation could be a melt extrusion lamination operation, thus applying an intermediate thermoplastic bonding layer 14a between the spacer layer and the print substrate and paper facing layer 12a. in this particular embodiment, however, the lamination of the print substrate paper facing layer 12a to the center module spacer layer 11a is carried out by simply applying a low amount of an aqueous solution of an adhesive 14a that is partly absorbed into the respective celllulose layers and efficiently adheres the two paper-cellulose layers together, the adhesive being starch or nano-/micro-fibrillar cellulose or polyvinyl alcohol/polyvinyl acetat or similar natural substances, which are able to bond to cellulose molecules.

The inside material module 1C, on the other side, the inside, of the spacer layer 11a, comprises a similar thin and high-density paper facing layer 13a, having a barrier coating 18a applied to it, the paper facing layer thus interacting in the sandwich structure with the spacer layer 11a and the outside module paper facing layer 12a. The inside material module also comprises an innermost, heat sealable thermoplastic layer 17a, which is also the layer of the packaging laminate that will be in direct contact with the filled food product in a final packaging container. The innermost, heat sealable polymer layer 17a may applied onto the paper facing layer by means of melt extrusion coating, or melt co-extrusion coating of a multilayer polymer structure onto the inside of the paper facing layer 13a with applied barrier coating 18a. The barrier coating is in this embodiment coated with a barrier polymer, applied onto the paper surface layer by means of aqueous dispersion coating in a preceding coating and drying operation. A barrier polymer may alternatively be applied by extrusion coating onto the thin paper substrate and facing layer. The barrier coated paper facing layer may alternatively be directed in the laminate such that the barrier coating 18a is facing outwards in the packaging laminate, towards the center module and spacer layer 11a, but in this particular embodiment it is directed inwards, towards the innermost sealing layer. In an alternative embodiment, the paper facing layer 13a provides some barrier properties in itself, when laminated between polymer layers, such that it may be uncoated and still provide some barrier properties and thus be the barrier layer without any further coating. There are example of such thin high-density papers having a compact surface, such as certain greaseproof papers. In addition to the inherent barrier properties, the greaseproof paper may be coated by a metallisation coating in order to enhance the barrier properties further. In particular, a metallised layer has the advantage of adding some light barrier properties to the laminate. The paper facing layer 13a in this example has a surface weight of 40 g/m$^2$. The barrier-coated paper 13a-18a is laminated to the spacer layer 11a by means of a low amount of an aqueous adhesive composition 15a, which is partly absorbed upon pressing the surfaces together in a press roller nip, into at least one of the surfaces to be adhered to each other.

Also the paper facing layer 12a in the outside module may be such a greaseproof paper, onto which a print surface is arranged by for example a thin clay-coat layer or a similar white coating layer (e.g., layer 20d in FIG. 1d), but is in this example a 70 g/m$^2$ high-density Kraft paper having a white printable surface.

The (co-)extrusion coating of the innermost layer 17a may be done before or after lamination of the inside material module 1C to the center module and spacer layer 11a. The innermost heat sealable layer or multilayer 17a may alternatively be applied in the form of a pre-manufactured film, adding some further stability and durability by being a mono- or biaxially oriented film to a higher degree than what is obtained in extrusion coating operations. Again, the inside material module 1C may be pre-laminated as a separate module inside, before laminating it to the center module and spacer layer 11c. in this particular embodiment, however, the barrier-coated paper facing layer 13a-18a is first laminated to the spacer layer 11a, or the rest of the laminated material, i.e. module 1A laminated to outside module 1B, and subsequently melt extrusion coating on the inner side of the barrier-coated paper layer with the layer or multilayer 17a of a heat sealable polymer being a polyolefin, being a low density composition comprising a blend of a metallocene-catalysed linear low density polyethylene (m-LLDPE) and a low density polyethylene (LDPE).

The resulting laminate has a bending stiffness well above 340 mN, which is what is usually required for Tetra Brik Aseptic® 1000 ml family packages.

Figure 1B:
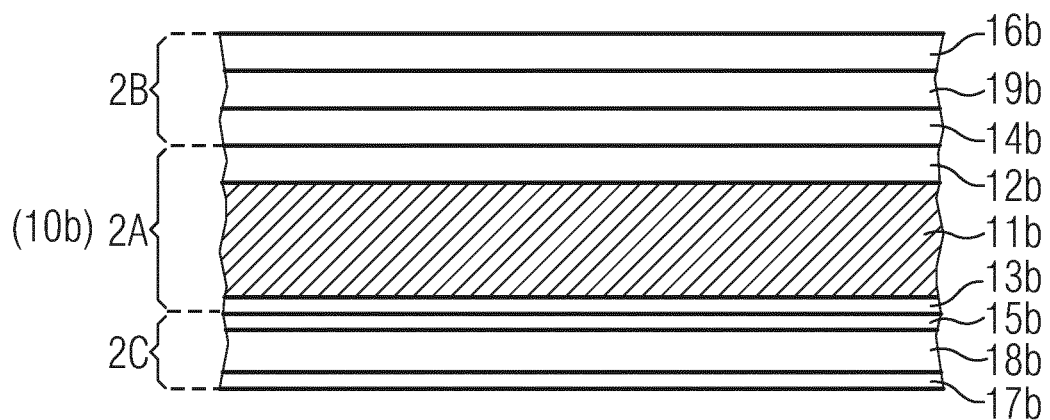
FIG. 1b shows a schematic, cross-sectional view of a further embodiment of a laminated packaging material of a three-modular laminate type.

In FIG. 1b, a similar cross-section, of a second embodiment of a laminated packaging material, 10b, is thus shown. It is also in principle a laminate composed from three initial modules of material layers that contribute to a sandwich structure that substantially provides the laminated material with its mechanical strength properties and provides a final packaging container with dimensional stability. Module 2A is a center layer of a bulk material comprising a spacer layer 11b of cellulose material, but has also paper facing layers 12b and 13b of thin high-density papers, integrated into the center bulk layer to interact with the spacer layer 11b. The paper facing layers 12b, 13b may be pre-laminated to the spacer layer 11b by the supplier of the spacer layer material, or at a site intended for this purpose. The lamination of the paper facing layers to the spacer layer is done by applying a low amount of an aqueous solution of an adhesive, onto one of the surfaces to be laminated together, the aqueous adhesive composition being partly absorbed into the respective cellulose layers while efficiently adhering the two paper-cellulose layers together. The adhesive is suitably a starch or nano-/micro-fibrillar cellulose or polyvinyl alcohol/polyvinyl acetat or similar natural substance, which is able to bond to cellulose molecules.

The outside material module 2B comprises a print substrate layer of a white pre-manufactured polymer film 19b having a print surface. Alternatively, the print substrate film may have a different colour or a metallised surface intended for printing with a non-white background appearance. In the final laminated material, the substrate 19b is printed and decorated with a print pattern from various colours, images and text. The outside material module 1B also comprises an outermost liquid-tight and transparent layer 16b of a plastic, preferably a heat sealable thermoplastic, such as a polyolefin, such as a polyethylene material layer. The print substrate 19b may be printed before or after lamination to the center module 2A, and the outermost plastic layer 16b may be applied onto the printed substrate film in a separate operation before or after lamination to the center module 2A or the rest of the laminate, i.e. modules 2A with module 2C. If coating of the decor printed film 19b, with the plastic outside layer 16b takes place before lamination to the center module 2A, the whole outside material module is thus prepared as one module, i.e. as a pre-made outside. The lamination operation is a melt extrusion lamination operation, thus applying an intermediate thermoplastic bonding layer 14b between the bulk material layer and center module 2A and the print substrate film 19b. The lamination operation may alternatively be carried out by applying a low amount of an aqueous solution of an adhesive that is partly absorbed into the paper facing layer 12b, i.e. the outer side of the center module 2A, and efficiently adheres it to the print substrate polymer film 19b.

The inside material module 2C, on the other side, the inside, of the center module 2A, comprises a barrier film 18b, being a polymer substrate film with a barrier coating applied onto a side. The inside material module also comprises an innermost, heat sealable thermoplastic layer 17b, which is also the layer of the packaging laminate that will be in direct contact with the filled food product in a final packaging container. The innermost, heat sealable polymer layer 17b may applied onto the barrier film by means of melt extrusion coating, or melt co-extrusion coating of a multilayer polymer structure onto the inside of the barrier film 18b. The barrier coating is in this embodiment provided with a vapour deposition barrier coating, applied onto the polymer film substrate by means of vapour deposition coating in a preceding vapour deposition operation. The barrier coating is in this embodiment a metallisation coating applied by means of physical vapour deposition, however not shown in the figure. The barrier coated film may alternatively be directed in the laminate such that the barrier coating is facing outwards in the packaging laminate, towards the center module and paper facing layer 13b, but in this particular embodiment it is directed inwards, towards the innermost sealing layer. The (co-)extrusion coating of the innermost layer 17b may be done before or after lamination of the inside material module 2C to the center module 2A. The barrier-coated film 18b is laminated to the spacer layer 11b by means of a low amount of an aqueous adhesive composition 15b, which is partly absorbed into at least one of the surfaces to be adhered to each other, without forced drying, upon pressing the surfaces together in a press roller nip.

The innermost heat sealable layer or multilayer 17b may alternatively be applied in the form of a pre-manufactured film, adding some further stability and durability by being an oriented film to a higher degree than what is obtained in extrusion coating operations. Again, the inside material module 2C may be pre-laminated as a separate module inside, before laminating it to the center module 2A. In this particular embodiment, however, the barrier-coated film 18b is first laminated to the bulk material, or the rest of the laminated material, i.e. modules 2A laminated to outside module 2B, and subsequently melt extrusion coating on the inner side of the barrier-coated film with the layer or multilayer 17b of a heat sealable polymer being a polyolefin, being a low density composition comprising a blend of a metallocene-catalysed linear low density polyethylene (m-LLDPE) and a low density polyethylene (LDPE).

Figure 1C:
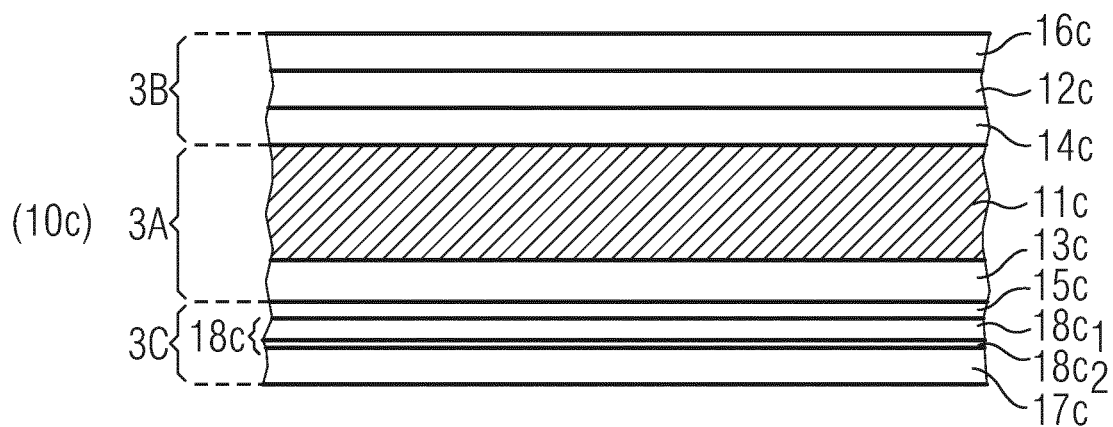
FIG. 1c shows a schematic, cross-sectional view of yet a further embodiment of a laminated packaging material of a three-modular laminate type.

FIG. 1c shows a cross-section, of a third embodiment of a laminated packaging material, 10c. It is also in principle a laminate composed from three initial modules of material layers that contribute to a sandwich structure that substantially provides the laminated material with its mechanical strength properties and provides a final packaging container with dimensional stability. Module 3A is a center layer of a bulk material comprising a spacer layer 11c of low-density cellulose material, but has also one paper facing layers 13c of thin high-density paper, integrated into the center bulk layer on the inside, in order to interact with the spacer layer 11c. The paper facing layer 13c may be pre-laminated to the spacer layer 11c by the supplier of the spacer layer material, or at a site intended for this purpose. The lamination of the paper facing layer to the spacer layer is done by applying a low amount of an aqueous solution of an adhesive, onto one of the surfaces to be laminated together, the aqueous adhesive composition being partly absorbed into the respective celllulose layers while efficiently adhering the two paper-cellulose layers together. The adhesive is suitably a starch or nano-/micro-fibrillar cellulose or polyvinyl alcohol/polyvinyl acetat or similar natural substance, which is able to bond to cellulose molecules.

The outside material module 3B comprises a print substrate layer of a thin, high-density paper 12c having a print surface. The paper 12c also constitutes a facing layer on the outside of the sandwich structure in interaction with the spacer layer 11*c*. In the final laminated material, the substrate 12*c* is printed and decorated with a print pattern from various colours, images and text. The outside material module 3B also comprises an outermost liquid-tight and transparent layer 16*c* of a plastic, preferably a heat sealable thermoplastic, such as a polyolefin, such as a polyethylene material layer. The print substrate and paper facing layer 12*c* may be printed before or after lamination to the center spacer layer, and the outermost plastic layer 16*c* is applied onto the printed substrate layer in a separate operation before or after lamination to the spacer layer 11*c*. If decor printing coating with the plastic layer 16*c* takes place before lamination to the center module spacer layer, the whole outside material module is thus prepared as one module, i.e. as a pre-made outside, which is then laminated to the center module or to the rest of the laminate, on the outside of the center spacer layer. The lamination operation could be a melt extrusion lamination operation, thus applying an intermediate thermoplastic bonding layer 14*c* between the spacer layer and the print substrate and paper facing layer 12*c*. In this particular embodiment, however, the lamination of the print substrate paper facing layer 12*c* to the center module spacer layer 11*c* is carried out by applying a low amount of an aqueous solution of an adhesive that is partly absorbed into the respective celllulose layers and efficiently adheres the two paper-cellulose layers together, the adhesive being starch or nano-/micro-fibrillar cellulose or polyvinyl alcohol/polyvinyl acetat or similar natural, biodegradable substances, which are able to bond to cellulose molecules.

The inside material module 3C, on the other side, the inside, of the center module 3A, comprises a barrier film 18*c*, being a polymer substrate film 18*c*1 with a barrier coating 18*c*2 applied onto a side. The inside material module also comprises an innermost, heat sealable thermoplastic layer 17*c*, which is also the layer of the packaging laminate that will be in direct contact with the filled food product in a final packaging container. The innermost, heat sealable polymer layer 17*c* may applied onto the barrier film by means of melt extrusion coating, or melt co-extrusion coating of a multilayer polymer structure onto the inside of the barrier film 18*c*. The barrier coating is in this embodiment provided with a vapour deposition barrier coating 18*c*2, applied onto the polymer film substrate by means of vapour deposition coating in a preceding vapour deposition operation. The barrier coating is in this embodiment a diamond-like carbon coating (DLC), applied by means of plasma enhanced chemical vapour deposition (PECVD), and which provides the barrier film with i.a. oxygen and water vapour barrier properties. Alternatively, the vapour deposition coating may be a metallisation coating applied by means of physical vapour deposition. In this particular embodiment the barrier coated side of the barrier film is directed inwards, towards the the innermost sealing layer. The (co-)extrusion coating of the innermost layer 17*c* may be done before or after lamination of the inside material module 3C to the center module 3A. The innermost heat sealable layer or multilayer 17*c* may alternatively be applied in the form of a pre-manufactured film, adding some further stability and durability by being a mono- or biaxially oriented film to a higher degree than what is obtained in extrusion coating operations. Again, the inside material module 3C may be pre-laminated as a separate module inside, before laminating it to the center module 3A. In this particular embodiment, however, the barrier-coated film 18*c* is first laminated to the bulk material, or the rest of the laminated material, i.e. modules 3A laminated to outside module 3B, and subsequently melt extrusion coated on the inner side of the barrier-coated film with the layer or multilayer 17*c* of a heat sealable polymer being a polyolefin, being a low density composition comprising a blend of a metallocene-catalysed linear low density polyethylene (m-LLDPE) and a low density polyethylene (LDPE). The barrier-coated film 18*c* is laminated to the spacer layer 11*c* by means of melt extrusion laminating with an intermediate thermoplastic bonding polymer of polyethylene 15*c*.

Figure 1D:
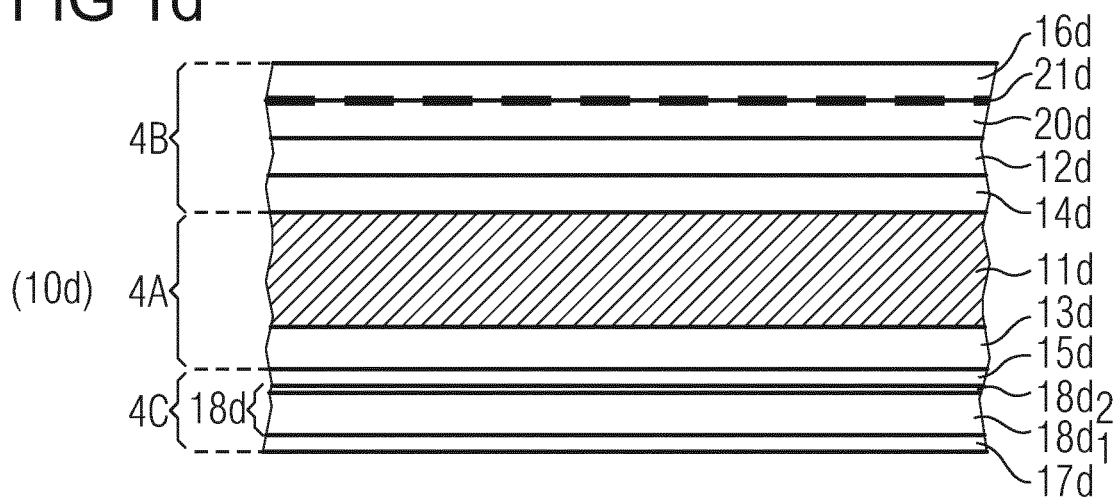
FIG. 1d shows a schematic, cross-sectional view of another further embodiment of a laminated packaging material of a three-modular laminate type.

FIG. 1*d* shows a cross-section, of a fourth embodiment of a laminated packaging material, 10*d*. It is also in principle a laminate composed from three initial modules of material layers that contribute to a sandwich structure that substantially provides the laminated material with its mechanical strength properties and provides a final packaging container with dimensional stability. Module 4A is a center layer of a bulk material comprising a spacer layer 11*d* of low-density cellulose material, but has also one paper facing layers 13*d* of thin high-density paper, integrated into the center bulk layer on the inside, in order to interact with the spacer layer 11*d*. The paper facing layers 13*d* may be pre-laminated to the spacer layer 11*d* by the supplier of the spacer layer material, or at a site intended for this purpose.

The outside material module 4B comprises a print substrate layer of a thin, high-density paper 12*d* having a print surface. The paper 12*d* also constitutes a facing layer on the outside of the sandwich structure in interaction with the spacer layer 11*d*. In the final laminated material, the substrate 12*d* is printed and decorated with a print pattern 21*d* from various colours, images and text. The outside material module 4B also comprises an outermost liquid-tight and transparent layer 16*d* of a plastic, preferably a heat sealable thermoplastic, such as a polyolefin, such as a polyethylene material layer. The print substrate and paper facing layer 12*d* may be printed before or after lamination to the center spacer layer, and the outermost plastic layer 16*d* is applied onto the printed substrate layer in a separate operation before or after lamination to the spacer layer 11*d*. If decor printing coating with the plastic layer 16*d* takes place before lamination to the center module spacer layer, the whole outside material module is thus prepared as one module, i.e. as a pre-made outside, which is then laminated to the center module or to the rest of the laminate, on the outside of the center spacer layer. The lamination operation could be a melt extrusion lamination operation, thus applying an intermediate thermoplastic bonding layer 14*d* between the spacer layer and the print substrate and paper facing layer 12*d*. In this particular embodiment, however, the lamination of the print substrate paper facing layer 12*d* to the center module spacer layer 11*d* is carried out by applying a low amount of an aqueous solution of an adhesive that is partly absorbed into the respective celllulose layers and efficiently adheres the two paper-cellulose layers together, the adhesive being starch or nano-/micro-fibrillar cellulose or polyvinyl alcohol/polyvinyl acetat or similar natural, biodegradable substances, which are able to bond to cellulose molecules.

The inside material module 4C, on the other side, the inside, of the center module 4A, comprises a barrier film 18*d*, being a polymer substrate film 18*d*1 with a barrier coating 18*d*2 applied onto a side. The inside material module also comprises an innermost, heat sealable thermoplastic layer 17*d*, which is also the layer of the packaging laminate that will be in direct contact with the filled food product in a final packaging container. The innermost, heat sealable polymer layer 17*d* may applied onto the barrier film by means of melt extrusion coating, or melt co-extrusion coating of a multilayer polymer structure onto the inside of the barrier film 18d. The barrier coating is in this embodiment provided with a vapour deposition barrier coating 18d2, applied onto the polymer film substrate by means of vapour deposition coating in a preceding vapour deposition operation. The barrier coating is in this embodiment a diamond-like carbon coating (DLC), applied by means of plasma enhanced chemical vapour deposition (PECVD), and which provides the barrier film with i.a. oxygen and water vapour barrier properties. Alternatively, the vapour deposition coating may be a metallisation coating applied by means of physical vapour deposition. The barrier coated film is according to this embodiment directed in the laminate such that the barrier coating is facing outwards in the packaging laminate, towards the center module and paper facing layer 13d. The (co-)extrusion coating of the innermost layer 17d may be done before or after lamination of the inside material module 4C to the center module 4A. The innermost heat sealable layer or multilayer 17d may alternatively be applied in the form of a pre-manufactured film, adding some further stability and durability by being a mono- or biaxially oriented film to a higher degree than what is obtained in extrusion coating operations. Again, the inside material module 4C may be pre-laminated as a separate module inside, before laminating it to the center module 4A. In this particular embodiment, however, the barrier-coated film 18d is first laminated to the bulk material, or the rest of the laminated material, i.e. modules 4A laminated to outside module 4B, and subsequently melt extrusion coated on the inner side of the barrier-coated film with the layer or multilayer 17d of a heat sealable polymer being a polyolefin, being a low density composition comprising a blend of a metallocene-catalysed linear low density polyethylene (m-LLDPE) and a low density polyethylene (LDPE).

The barrier-coated film 18d is laminated to the spacer layer 11d by means of a low amount of an aqueous adhesive composition 15d, which is partly absorbed into at least one of the surfaces to be adhered to each other, without forced drying, upon pressing the surfaces together in a press roller nip.

In the laminated packaging materials, the thin, high-density paper facing layer of the outside material module may thus be a paper with a grammage from 20 to 100, such as from 30 to 80, such as from 30 to 60 g/m$^2$, and having a density from 600 to 1500 kg/m$^3$. In particular embodiments, the paper facing layer may be a greaseproof paper, alone or coated with a further barrier coating, such as for example a metallisation coating. Some greaseproof papers provide gas barrier of lower than 2 cc/m2/day/atm at 23° C. and 50% RH, when laminated between plastic layers, such as polyethylene laminate layers.

Figure 2A:
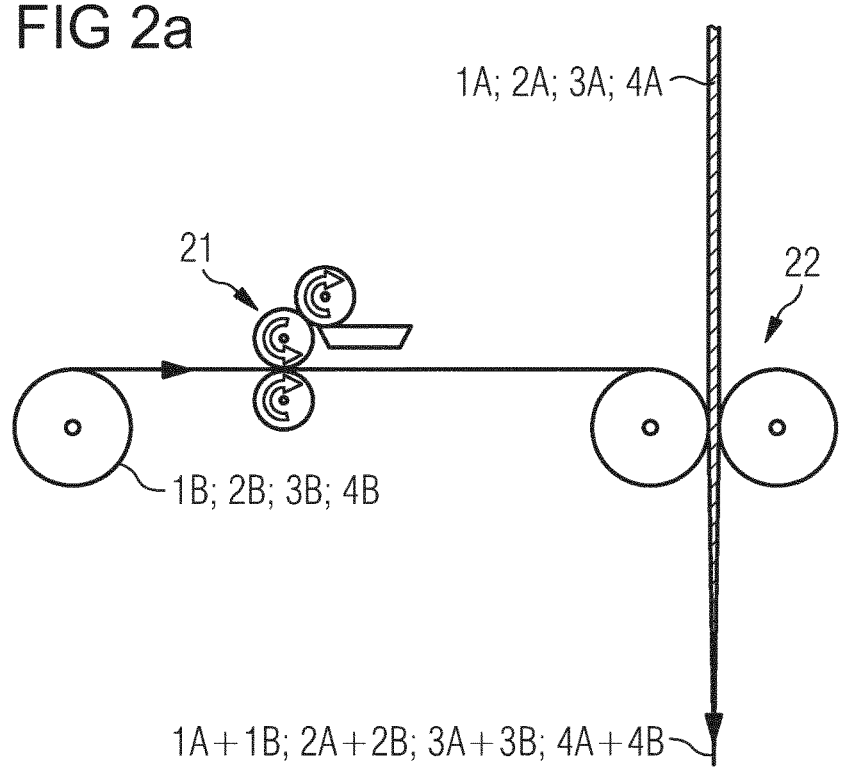
FIG. 2a shows schematically an example of a method, for laminating and outside (or inside) material module to the bulk material in accordance with the invention.

In FIG. 2a it is schematically illustrated how one module may be laminated to another module by cold (ambient), i.e. without heat drying or curing, aqueous adhesive absorption lamination, such that a very low amount of an aqueous adhesive solution is applied onto one of the surfaces to be laminated to each other, the queous adhesive solution then being absorbed into one or both of the two surfaces while adhering them together under the application of pressure. Thus, in the embodiments for manufacturing the laminated packaging materials in FIGS. 1a-1d, an aqueous adhesive solution is applied onto the surface to be laminated, of the outside material module 1B;2B;3B;4B, i.e. the non-print surface of the print substrate layer 12a;19b;12c;12d, in an adhesive application operation 21. At a lamination nip between two nip rollers, a web of the center module material 1A;2A;3A;4A is laminated 22 to a web of the outside module material 1B;2B;3B;4B under simultaneous forwarding of the two webs through the lamination nip, at a pressure sufficiently high for adhering the two surfaces together, but not so high that the low density spacer layer of the sandwich structure is collapsed. The obtained web of the intermediate pre-laminate of two modules 1A+16;2A+26;3A+36;4A+4B is forwarded to a further lamination station for lamination to the third module or parts of it as will be described herein below in FIG. 2b, or alternatively wound up onto a reel for intermediate storage or transport to a different time or place, where the final lamination and finishing steps will take place. The cold aqueous adhesive absorption lamination method may also or alternatively be applied when laminating the inside material module to the center module material.

Figure 2B:
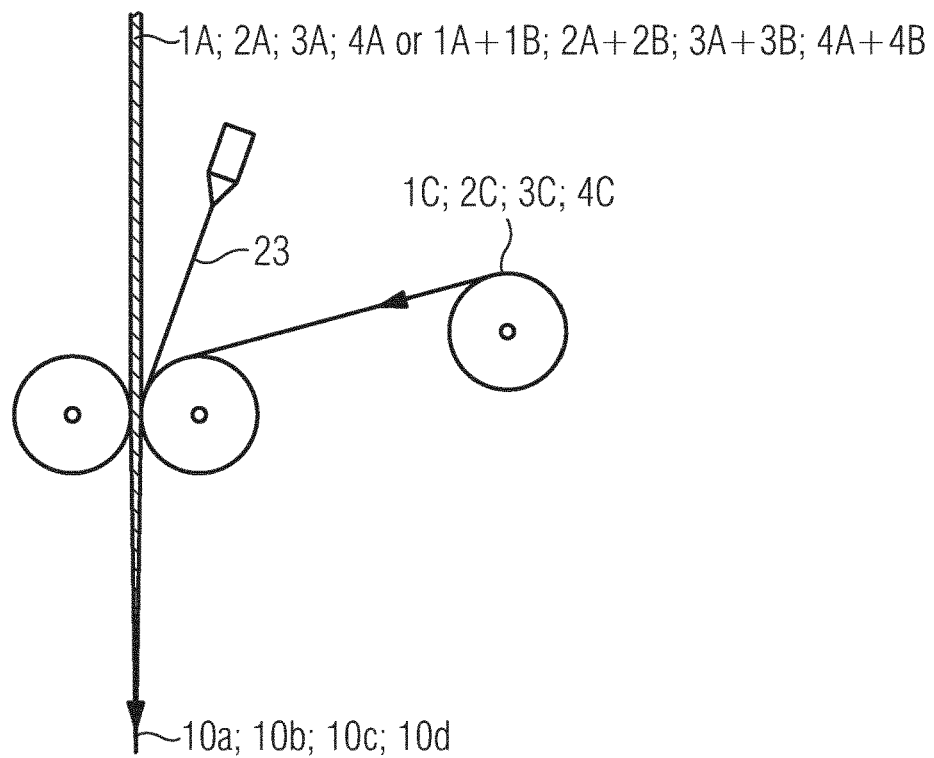
FIG. 2b shows schematically an example of a different method, for laminating an inside (or outside) material module to the bulk material, in accordance with the invention.

In FIG. 2b it is schematically illustrated how one module may be laminated to another module by melt extrusion lamination such that the two surfaces to be laminated are bonded to each other by an intermediate thermoplastic bonding layer. According to this example, the web of the pre-laminate of the two modules laminated in the example of FIG. 2a is forwarded to a lamination nip at the same time as a web of the inside material module 1C;2C;3C;4C. At the same time, a molten curtain of a thermoplastic bonding polymer 23; 15a;15b;15c;15d is extruded down into the lamination roller nip, and being cooled while pressing the two webs together, such that sufficient adhesion is obtained between the cellulose-based center module, i.e. the surface of the spacer layer 11a or the surface of the integrated paper facing layer 13b;13c;13d and the barrier layer 13a; 18b or barrier film 18c;18d of the inside material module.

Figure 3A:
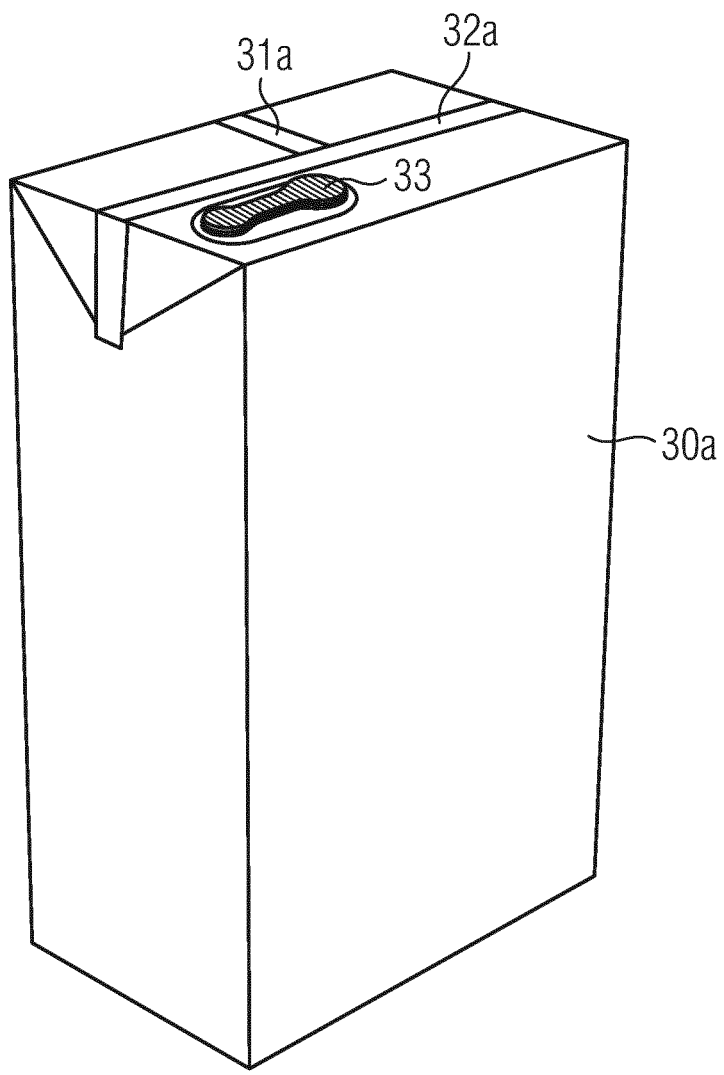
FIG. 3a, 3b, 3c, 3d show typical examples of packaging containers produced from the laminated packaging material according to the invention.

FIG. 3a shows an embodiment of a packaging container 30a produced from the packaging laminate 10a;10b;10c;10d according to the invention. The packaging container is particularly suitable for beverages, sauces, soups or the like. Typically, such a package has a volume from about 100 to 1000 ml. It may be of any configuration, but is preferably brick-shaped, having longitudinal and transversal seals 31a and 32a, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

Figure 3B:
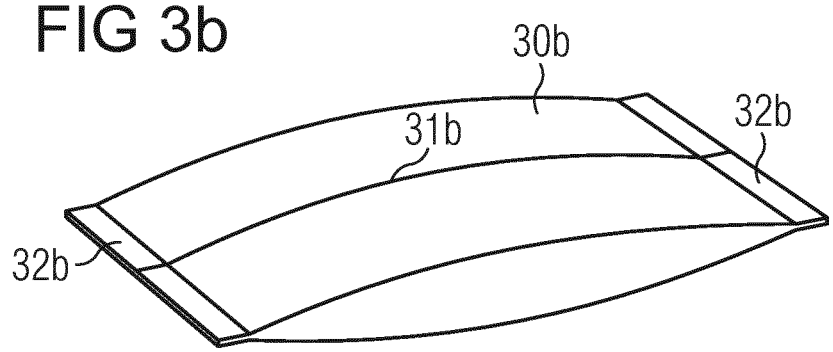

FIG. 3b shows an alternative, preferred example of a packaging container 30b produced from an alternative packaging laminate according to the invention. The alternative packaging laminate is thinner by having a thinner cellulose bulk layer 11, and thus it is not dimensionally stable enough to form a cuboid, parallellepipedic or wedge-shaped packaging container, and is not fold formed after transversal sealing 32b. It will thus remain a pillow-shaped pouch-like container and be distributed and sold in this form. The container has a longitudinal seal 31b.

Figure 3C:
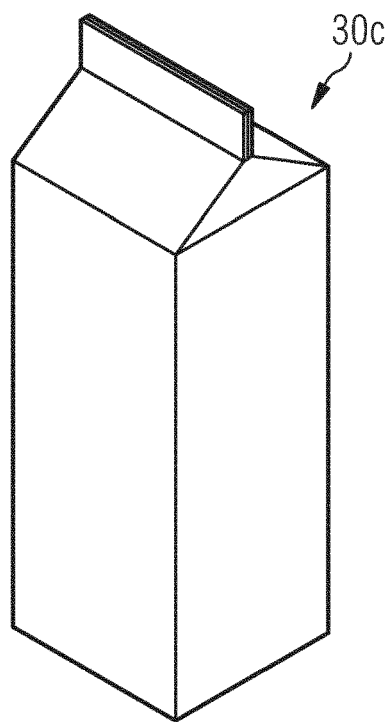

FIG. 3c shows a gable top package 30c, which is fold-formed from a pre-cut sheet or blank, from the laminated packaging material comprising a bulk layer of paperboard and the durable barrier film of the invention. Also flat top packages may be formed from similar blanks of material.

Figure 3D:
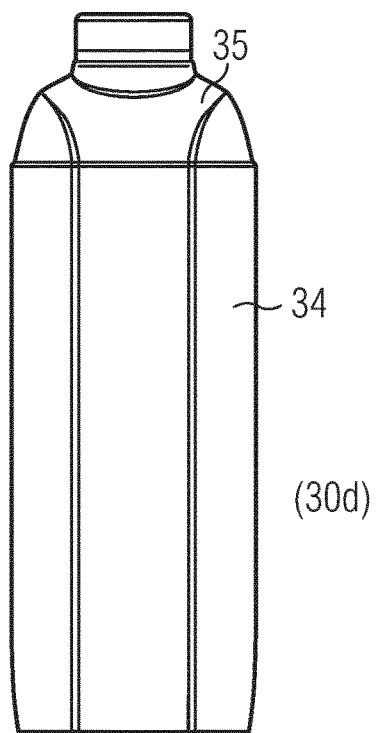

FIG. 3d shows a bottle-like package 30d, which is a combination of a sleeve 34 formed from a pre-cut blanks of the laminated packaging material of the invention, and a top 35, which is formed by injection moulding plastics in combination with an opening device such as a screw cork or the like. This type of packages are for example marketed under the trade names of Tetra Top® and Tetra Evero®. Those particular packages are formed by attaching the moulded top 35 with an opening device attached in a closed position, to a tubular sleeve 34 of the laminated packaging material, sterilizing the thus formed bottle-top capsule, filling it with the food product and finally fold-forming the bottom of the package and sealing it.

FIG. 4 shows the principle as described in the introduction of the present application, i.e. a web of packaging material is formed into a tube 41 by the longitudinal edges 42, 42' of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

FIG. 5 shows the importance of having symmetry around a spacer layer, for obtaining suffient compression strength of packaging containers made from the laminated material such that the packages may be stacked on top of each other during storage and distribution on pallets, without the corners being flattened and the packages broken or distorted from their initial cuboid shape, so-called "buckling". In packaging material compression tests, it was shown that by using a thin paper facing layer of 70 g/m$^2$, on each side of a foamed cellulose layer of 600 um thickness, the packaging material compression strength was even improved with about 10% in comparison to today's conventional, high stiffness paperboard-aluminium foil packaging laminates, whereas any non-symmetric structure involving aluminium foil on the inside of the spacer layer and a thin paper facing layer on the outside, will have a significantly reduced package compression strength. In the sample laminates different spacer layers of foamed cellulose were used, from different standard fibre types "150 ST", and different thicknesses (400, 600, 900 μm), between a 70 g/m$^2$ paper facing layer and a 6.3 μm aluminium foil. The reference used a conventional 270 mN liquid paperboard as the bulk layer laminated to the same aluminium foil, but only having a polymer layer laminated to the outside of the bulk layer.

The packaging material compression strength was measured according to Scan-P 46:83.

FIG. 6 shows the importance of having symmetry around a spacer layer, for avoiding that the laminated packaging material exhibits curling when the relative moisture content in the material increases from 50% RH to 90% RH, such as may be the case during long-term storage of liquid-filled packages in some environments. The diagram thus shows the increase or decrease of curling, at moisture increase. Curling at higher relative moisture content in laminated packaging materials based on paper or paperboard bulk layers are believed contribute significantly to problems of loss of dimension stability of packaging containers made from the material, such as bulging phenomena around folded corners and edges of the laminated carton material. Among the non-symmetric laminate structures, there were sandwich structures having a thin paper facing layer on one side, and a relatively stiff but very thin aluminium foil or polymer film on the other side, and it can be seen that it is almost impossible to avoid that the laminated material curls. Also a reference material (sample 4131) having a conventional paperboard and a barrier layer of aluminium foil exhibits significant curling in the cross direction of the laminate under humid circumstances. When laminating according to the invention, on the other hand, such that a bulk layer has a thin paper on each side, it is clear that the problem regarding increase of curling at increasing moisture content as good as disappears in the cross direction and is insignificant in the machine direction. It is believed that it is best that the main facing layer on each side of a low-density spacer layer is a cellulose-or paperbased layer, which is hygroscopic and absorbs equal or at least similar amounts of moisture at an increase of relative moisture RH in the laminated packaging material. In the samples 4180 and 4182, there is a high-density paper facing layer of 70 g/m$^2$ on each side of the spacer layer.

Having two opposite facing materials that expand similarly when exposed to an increased relative humidity, RH, will therefore provide a robust packaging material and package that is insensitive to variations in climate during storage and transportation.

The sandwich packaging material variants were evaluated for moisture curl test by first conditioning the variants at 50, 70 and 90% RH for at least 48 h. The tests were performed using a vernier calliper and a metal plate. The metal plate was placed 10 cm from sample edge (in CD or MD) and the height between table and sample edge was measured. A minus sign indicated a curl towards inside/foil, otherwise the curl was towards outside/decor.

Figure 7:
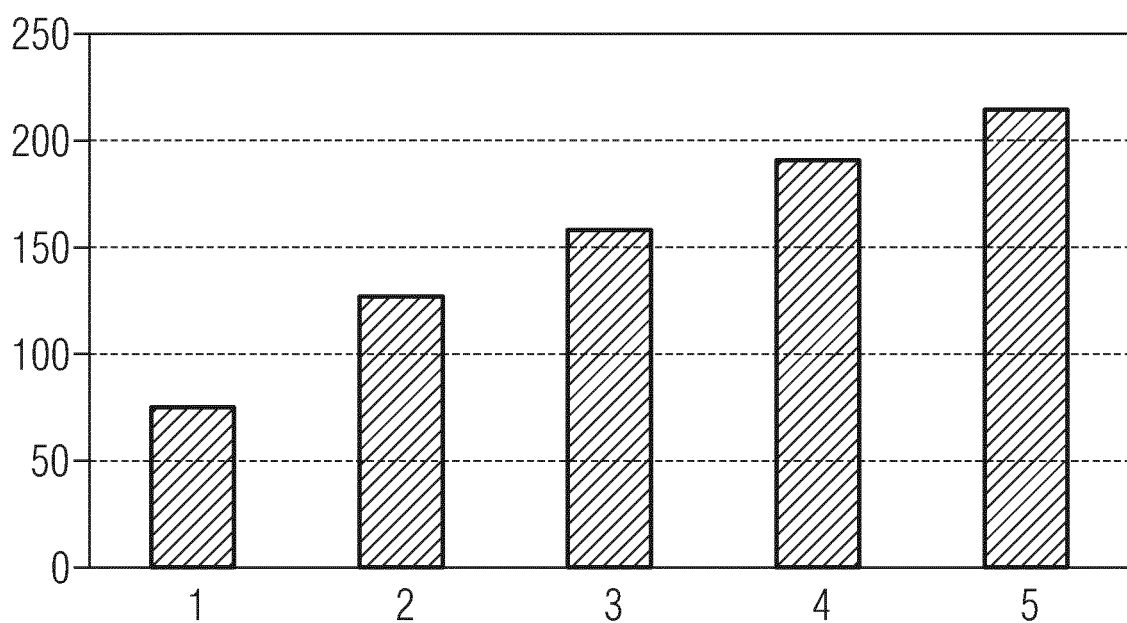
FIG. 7 shows how bending stiffnesses can vary with some exemplary sandwich structures within laminated packaging materials.

FIG. 7 illustrates similarly how the bending stiffness of a laminated packaging material increases with the incorporation of at least one paper facing layer on a side of a low-stiffness bulk paperboard or a low-density cellulose-based spacer layer.

The laminated samples tested for bending stiffness were:
1: an 80 mN stiff paperboard for small packages
2: the paperboard of 1, laminated with a 6.3 μm thick aluminium foil
3: the paperboard of 1, laminated with a greaseproof paper of 40 g/m$^2$ greaseproof paper
4: a bulk layer of 165 g/m$^2$ fluting material laminated with a 72 g/m$^2$ paper on one side and with a 6.3 μm thick aluminium foil on the other side
5: a bulk layer of 165 g/m$^2$ fluting material laminate with a 72 g/m$^2$ paper on one side and with a greaseproof paper of 40 g/m$^2$ greaseproof paper on its other side.

Figure 8:
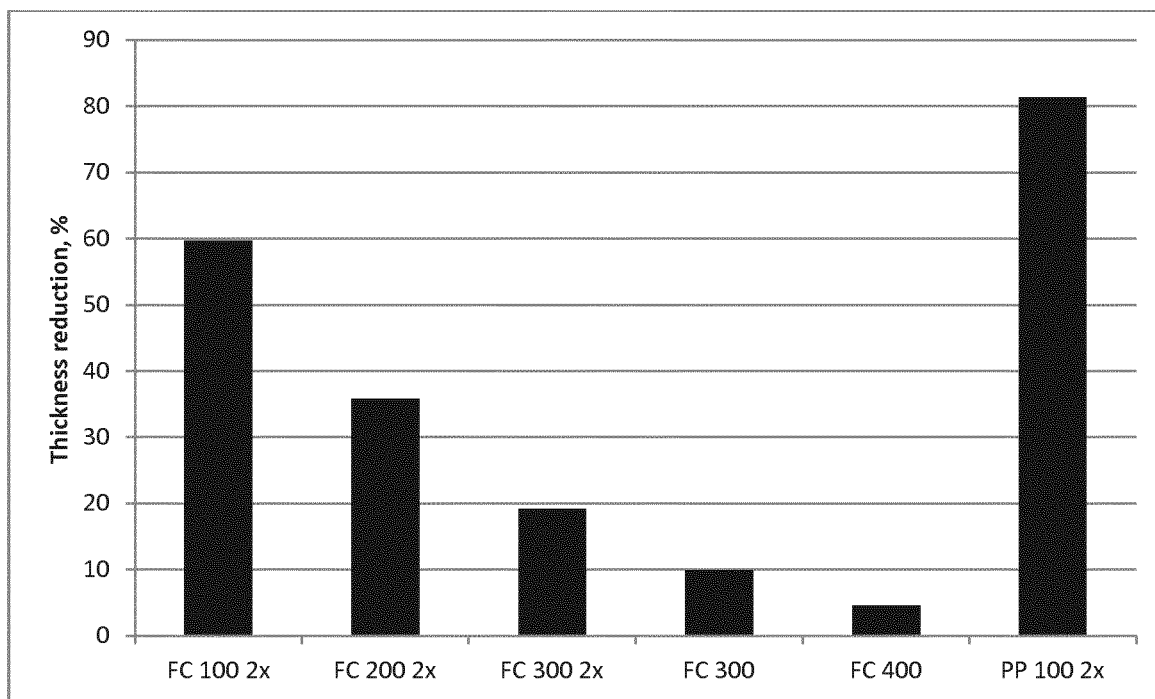
FIG. 8 illustrates the resulting thickness reduction after laminating a bulk layer having a spacer layer of a foamed cellulose of low densities.

FIG. 8 illustrates the resulting thickness reduction after laminating a bulk having a spacer layer of a foamed cellulose. For example the ID "FC 300 2x" means that a foamed cellulose of density 300 kg/m$^3$ was laminated with a nip load twice as large as the reference nip load. Generally, it can be seen that the remaining thickness of foamed cellulose is substantially higher compared to the laminate variant with foamed polymer materials of similar light-weight.

It was also concluded that lamination by extrusion coating works well with cellulose foam having a density of 300 kg/m3 or higher. Normally, bulk or spacer layers with low density materials are more sensitive to lamination heat and pressure, and show higher reduction of the thickness of the foam material.

Furthermore, while the thickness reduction of a polymer foam is permanent, due to melting and re-shaping of the heated polymer foam cells, there is a spring-back effect in the foamed cellulose spacer layer, such that the thickness reduction during lamination is reversed to a final thickness which is only reduced by about 10-15% in the reference nip at densities around 300-400 kg/m3. The higher the density of a cellulose foam, the better this spring-back effect, or z-directional, ZD, compression strength, will be. It was thus concluded that foamed cellulose is a material that, unlike other light-weight materials, will work for lamination into laminated packaging materials having sufficient bending stiffness and mechanical stability in order to form dimension stable fold-formed packages for liquid food packaging, despite the very low density of such a spacer material.

It can thus be seen that a bulk layer having low bending stiffness can be more properly supported by a paper facing layer on at least one side, and clearly best with such a paper facing layer on each side of the bulk layer. The bending stiffness of the samples was measured by Lorentzen & Wettre according to ISO2493-1.

We have accordingly seen that the new laminated packaging material of the invention, also enables the providing of packaging containers with good integrity properties also under wet conditions, i.e. for the packaging of liquid or wet food products with long shelf life.

Generally, the grammages mentioned in the above and following description are as measured by SCAN P 6:75. The material densities and layer thicknesses were measured as by ISO 534:1988.

The invention is not limited by the embodiments shown and described above, but may be varied within the scope of the claims. As a general remark, the proportions between thicknesses of layers, distances between layers and the size of other features and their relative size in comparison with each other, should not be taken to be as shown in the figures, which are merely illustrating the order and type of layers in relation to each other all other features to be understood as described in the text specification.

What is claimed is:

1. Method of manufacturing a laminated cellulose-based liquid or semi-liquid food packaging material, for heat sealing into packaging containers having mechanical strength and barrier properties, the method comprising
    a) providing a web of a center module of bulk material comprising a cellulose spacer layer which has a density below 850 kg/m$^3$, a grammage from 60 to 250 g/m$^2$, and is a containerboard material having a Short Compression Test Index value of at least 30 Nm/g in the machine direction, as determined in accordance with ISO 9895 and ISO 536, the web of the center module of bulk material also comprising a first paper facing layer on an inside of the spacer layer, the inside of the spacer layer being that side which is to be directed to an inside of the packaging container made from the laminated packaging material,
    b) providing a web of an outside material module, comprising a second paper facing layer having a surface directed towards an outer side of the outside material module, the outside material module being intended for that side of the center module of bulk material which is to be directed to an outside of the packaging container made from the laminated packaging material,
    c) laminating an outside of the web of the center module of bulk material and the web of the outside material module to each other,
    d) adding print to the outside material module,
    e) providing a web of an inside material module intended for that side of the center module of bulk material which is to be directed to the inside of the packaging container made from the laminated packaging material, the web of the inside material module comprising a polymer substrate film and a barrier coating applied to the polymer substrate film,
    f) laminating the web of the inside material module and an inside of the web of the center module of bulk material to each other,
    g) applying an outermost, transparent and liquid-tight protective layer on an outside of the outside material module,
    h) applying an outermost thermoplastic, liquid-tight and heat sealable layer on an inside of the inside material module,
    i) thus obtaining a web of a laminated cellulose-based liquid- or semi-liquid food packaging material,
    wherein the spacer layer constitutes a center of a sandwich structure within the laminated packaging material, the sandwich structure having the second paper facing layer of the web of the outside material module arranged on one side of the spacer layer and interacting with the first paper facing layer of the web of the center module of bulk material arranged on an other side of the spacer layer, the second paper facing layer of the web of the outside material module and the first paper facing layer of the web of the center module of bulk material having lower thickness and a higher Young's modulus than the spacer layer.

2. Method as claimed in claim 1, wherein the first paper facing layer is directly adjacent the spacer layer.

3. Method as claimed in claim 2, wherein the first paper facing layer of the center module of bulk material has a grammage from 20 to 100 g/m$^2$, a density from 600 to 1500 kg/m$^3$ and a Young's modulus from 1 to 10 GPa.

4. Method as claimed in claim 1, wherein the polymer substrate film is laminated to an inside surface of the web of the center module of bulk material by an intermediate bonding layer or adhesive.

5. Method as claimed in claim 1, wherein the surface of the second paper facing layer of the web of the outside material module is a printable surface to which the print is added, and the printable surface is a white paper surface or a metallised film or metallised paper surface.

6. Method as claimed in claim 1, wherein the web of the outside material module is laminated to the web of the center module of bulk material by applying an aqueous adhesive composition at an amount from 0.5 to 4 g/m$^2$ to one of the surfaces to be laminated to each other and pressing them together.

7. Method as claimed in claim 1, wherein the web of the inside material module is laminated to the web of the center module of bulk material by applying an aqueous adhesive composition at an amount from 0.5 to 4 g/m$^2$ to one of the surfaces to be laminated to each other and pressing them together.

8. Laminated packaging material obtained by the method as claimed in claim 1.

9. Packaging container comprising the laminated packaging material obtained by the method as claimed in claim 1.

10. Method as claimed in claim 1, wherein the barrier coating is a liquid-film coated barrier comprising a polymer selected from the group consisting of vinyl alcohol-based polymers, acrylic acid or methacrylic acid based polymers (PAA, PMAA), polysaccharides, cellulose nanofibrils (CNF), nanocrystalline cellulose (NCC), chitosan or other cellulose derivatives, hemicelluloses, water dispersible polyvinylidenechloride (PVDC) or water dispersible polyesters, or combinations of two or more thereof.

11. Method as claimed in claim 10, wherein the liquid-film coated barrier is polyvinyl alcohol (PVOH) or water dispersible ethylene vinyl alcohol copolymer (EVOH).

12. Method as claimed in claim 10, wherein the liquid-film coated barrier is a starch or starch derivative.

13. Method as claimed in claim 1, wherein the barrier coating is applied by physical vapour deposition or chemical vapour deposition onto a surface of the polymer substrate film.

14. Method of manufacturing a laminated cellulose-based liquid or semi-liquid food packaging material, for heat sealing into packaging containers having mechanical strength and barrier properties, the method comprising
- a) providing a web of a center module of bulk material comprising a cellulose spacer layer which has a density below 850 kg/m³, a grammage from 60 to 250 g/m², and is a containerboard material having a Short Compression Test Index value of at least 30 Nm/g in the machine direction, as determined in accordance with ISO 9895 and ISO 536, the web of the center module of bulk material also comprising a first paper facing layer on an inside of the spacer layer, the inside of the spacer layer being that side which is to be directed to an inside of the packaging container made from the laminated packaging material,
- b) providing a web of an outside material module, comprising a second paper facing layer having a surface directed towards an outer side of the outside material module, the outside material module being intended for that side of the center module of bulk material which is to be directed to an outside of the packaging container made from the laminated packaging material,
- c) laminating an outside of the web of the center module of bulk material and the web of the outside material module to each other by applying an aqueous adhesive composition at an amount from 0.5 g/m² to 4 g/m² to a surface of the web of the center module of bulk material or the web of the outside material module and then pressing the web of the center module of bulk material and the web of the outside material module together,
- d) adding print to the outside material module,
- e) providing a web of an inside material module intended for that side of the center module of bulk material which is to be directed to the inside of the packaging container made from the laminated packaging material, the web of the inside material module comprising a polymer substrate film and a barrier coating applied to the polymer substrate film,
- f) laminating the web of the inside material module and an inside of the web of the center module of bulk material to each other by applying an aqueous adhesive composition at an amount from 0.5 g/m² to 4 g/m² to a surface of the web of the center module of bulk material or the web of the inside material module and then pressing the web of the center module of bulk material and the web of the inside material module together,
- g) applying an outermost, transparent and liquid-tight protective layer on an outside of the outside material module,
- h) applying an outermost thermoplastic, liquid-tight and heat sealable layer on an inside of the inside material module,
- i) thus obtaining a web of a laminated cellulose-based liquid- or semi-liquid food packaging material in which the cellulose spacer layer constitutes a center of a sandwich structure within the laminated packaging material, the sandwich structure having at least the first paper facing layer arranged on one side of the spacer layer and interacting with the second paper facing layer arranged on an other side of the spacer layer, the first paper facing layer and the second paper facing layer having lower thickness and a higher Young's modulus than the spacer layer.

15. Method as claimed in claim 14, wherein the first paper facing layer is directly adjacent the spacer layer.

16. Method as claimed in claim 14, wherein the first paper facing layer of the center module of bulk material has a grammage from 20 to 100 g/m², a density from 600 to 1500 kg/m³ and a Young's modulus from 1 to 10 GPa.

17. Method as claimed in claim 14, wherein the polymer substrate film is laminated to an inside surface of the web of the center module of bulk material by an intermediate bonding layer or adhesive.

18. Method as claimed in claim 14, wherein the surface of the second paper facing layer of the web of the outside material module is a printable surface to which the print is added, and the printable surface is a white paper surface or a metallised film or metallised paper surface.

19. Method as claimed in claim 14, wherein the adding of the print occurs after the laminating of the outside of the web of the center module of bulk material and the web of the outside material module to each other.

20. Method of manufacturing a laminated cellulose-based liquid or semi-liquid food packaging material, for heat sealing into packaging containers having mechanical strength and barrier properties, the method comprising
- a) providing a web of a center module of bulk material comprising a cellulose spacer layer which has a density below 850 kg/m³, a grammage from 60 to 250 g/m², and is a containerboard material having a Short Compression Test Index value of at least 30 Nm/g in the machine direction, as determined in accordance with ISO 9895 and ISO 536,
- b) providing a web of an outside material module, comprising a print substrate layer having a surface directed towards an outer side of the outside material module, the outside material module being intended for that side of the center module of bulk material which is to be directed to an outside of the packaging container made from the laminated packaging material,
- c) laminating an outside of the web of the center module of bulk material and the web of the outside material module to each other,
- d) adding print to the outside material module to produce a print pattern,
- e) providing a web of an inside material module intended for that side of the center module of bulk material which is to be directed to an inside of the packaging container made from the laminated packaging material, the web of the inside material module comprising a polymer substrate film and a barrier coating applied to the polymer substrate film,
- f) laminating the web of the inside material module and inside of the web of the center module of bulk material to each other,
- g) applying an outermost, transparent and liquid-tight protective layer on an outside of the outside material module,
- h) applying an outermost thermoplastic, liquid-tight and heat sealable layer on an inside of the inside material module,
- i) thus obtaining a web of a laminated cellulose-based liquid- or semi-liquid food packaging material in which the spacer layer constitutes a center of a sandwich structure within the laminated packaging material, the sandwich structure having a paper facing layer arranged on one side of the spacer layer between the print pattern and the spacer layer and also having the polymer substrate film with the applied barrier coating arranged on an other side of the spacer layer, the paper facing layer having lower thickness and a higher Young's modulus than the spacer layer.

21. Method as claimed in claim 20, wherein the paper facing layer is one paper facing layer, the web of the center module of bulk material also comprising an other paper facing layer on an inside of the spacer layer before the laminating of the outside of the web of the center module of bulk material and the web of the outside material module to each other.

22. Method of manufacturing a laminated cellulose-based liquid or semi-liquid food packaging material, for heat sealing into packaging containers having mechanical strength and barrier properties, the method comprising
   a) providing a web of a center module of bulk material comprising a cellulose spacer layer which has a density below 850 kg/m$^3$, a grammage from 60 to 250 g/m$^2$, and is a containerboard material having a Short Compression Test Index value of at least 30 Nm/g in the machine direction, as determined in accordance with ISO 9895 and ISO 536, the web of the center module of bulk material also comprising a first paper facing layer on an inside of the spacer layer, the inside of the spacer layer being that side which is to be directed to an inside of the packaging container made from the laminated packaging material, the web of the center module of bulk material also comprising a second paper facing layer on an outside of the spacer layer, the outside of the spacer layer being that side which is to be directed to an outside of the packaging container made from the laminated packaging material,
   b) providing a web of an outside material module, comprising a print substrate layer having a surface directed towards an outer side of the outside material module, the outside material module being intended for that side of the center module of bulk material, which is to be directed to the outside of the packaging container made from the laminated packaging material,
   c) laminating an outside of the web of the center module of bulk material and the web of the outside material module to each other,
   d) adding print to the surface of the print substrate layer,
   e) providing a web of an inside material module comprising a polymer substrate film with an applied barrier coating, the inside material module being intended for that side of the center module of bulk material which is to be directed to an inside of the packaging container made from the laminated packaging material,
   f) laminating the web of the inside material module and an inside of the web of the center module of bulk material to each other,
   g) applying an outermost, transparent and liquid-tight protective layer on an outside of the outside material module,
   h) applying an outermost thermoplastic, liquid-tight and heat sealable layer on an inside of the inside material module,
   i) thus obtaining a web of a laminated cellulose-based liquid- or semi-liquid food packaging material in which the spacer layer constitutes a center of a sandwich structure within the laminated packaging material, the sandwich structure having the first paper facing layer arranged on one side of the spacer layer and interacting with the second paper facing layer arranged on an other side of the spacer layer, the first and second paper facing layers having lower thickness and a higher Young's modulus than the spacer layer.

* * * * *